United States Patent
Campbell et al.

(10) Patent No.: US 8,944,239 B2
(45) Date of Patent: Feb. 3, 2015

(54) CONVEYOR APPARATUS FOR LOADING OR UNLOADING PACKAGES FROM SHIPPING CONTAINERS

(71) Applicant: Engineered Lifting Systems & Equipment Inc., Elmira (CA)

(72) Inventors: Colin A. Campbell, Guelph (CA); Brad R. H. Reger, Kitchener (CA)

(73) Assignee: Engineered Lifting Systems & Equipment Inc., Elmira, Ontario (CA)

(*) Notice: Subject to any disclaimer, the term of this patent is extended or adjusted under 35 U.S.C. 154(b) by 113 days.

(21) Appl. No.: 13/917,832

(22) Filed: Jun. 14, 2013

(65) Prior Publication Data

US 2013/0277175 A1   Oct. 24, 2013

Related U.S. Application Data

(63) Continuation-in-part of application No. 12/911,857, filed on Oct. 26, 2010, now Pat. No. 8,464,859.

(51) Int. Cl.
| | |
|---|---|
| *B65G 15/26* | (2006.01) |
| *B65G 21/14* | (2006.01) |
| *B65G 41/00* | (2006.01) |
| *B65G 67/08* | (2006.01) |
| *B65G 13/12* | (2006.01) |

(52) U.S. Cl.
CPC ............ *B65G 21/14* (2013.01); *B65G 41/002* (2013.01); *B65G 67/08* (2013.01); *B65G 13/12* (2013.01)
USPC ...................... 198/588; 198/861.3; 198/861.4

(58) Field of Classification Search
CPC ...... B65G 21/14; B65G 41/005; B65G 13/12; B65G 41/002
USPC ................. 198/861.3, 861.4, 861.5, 588, 812
See application file for complete search history.

(56) References Cited

U.S. PATENT DOCUMENTS

| | | | |
|---|---|---|---|
| 2,971,631 A | 12/1958 | Gray | |
| 3,651,963 A | 3/1972 | McWilliams | |
| 3,837,510 A | 9/1974 | McWilliams | |
| 3,866,768 A | 2/1975 | Weir | |
| 3,885,682 A | 5/1975 | McWilliams | |
| 3,931,897 A | 1/1976 | Bacon et al. | |
| 3,982,625 A | 9/1976 | Wentz et al. | |
| 4,281,955 A | 8/1981 | McWilliams | |
| 4,813,526 A | 3/1989 | Belanger | |
| 6,006,893 A | 12/1999 | Gilmore et al. | |
| 6,431,346 B1 | 8/2002 | Gilmore et al. | |
| 6,823,985 B2 | 11/2004 | Gilmore et al. | |
| 8,464,859 B2 * | 6/2013 | Campbell et al. | 198/588 |
| 8,662,291 B2 * | 3/2014 | Henderson | 198/812 |
| 8,714,334 B2 * | 5/2014 | Yang et al. | 198/588 |

* cited by examiner

*Primary Examiner* — James R Bidwell
(74) *Attorney, Agent, or Firm* — Bereskin & Parr LLP/S.E.N.C.R.L., s.r.l.

(57) ABSTRACT

A conveyor apparatus includes a frame, and a pivoting conveyor coupled to the frame. The pivoting conveyor includes a pivotable conveyor section having a free end shaped for supporting objects and a first conveying surface. The first pivotable conveyor section is pivotally coupled to the frame about a vertical axis for pivoting the free end from side-to-side, and a horizontal axis for pivoting the free end up and down. The pivoting conveyor also includes a second non-pivotable conveyor section having a second conveying surface. Furthermore, the pivoting conveyor includes a fixed transition plate located adjacent to the second conveying surface, and a shuttling transition plate located adjacent to the first conveying surface. The shuttling transition plate is configured to move laterally from side-to-side relative to the first conveying surface as the first pivotable conveyor section pivots about the vertical axis. The apparatus may include a third tiltable conveyor section having a rear end and being pivotally coupled to the frame about a second horizontal axis for pivoting the rear end up and down.

24 Claims, 17 Drawing Sheets

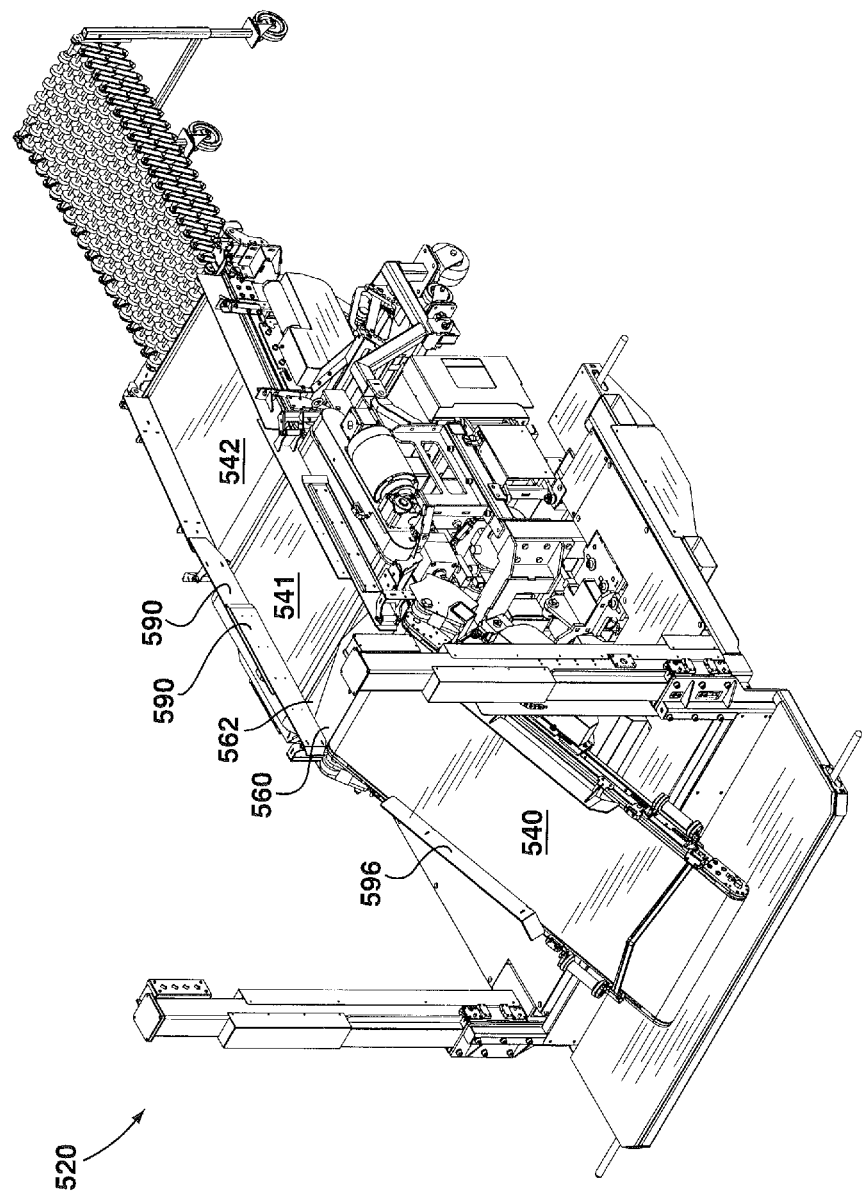

CONVEYOR APPARATUS FOR LOADING OR UNLOADING PACKAGES FROM SHIPPING CONTAINERS

RELATED APPLICATIONS

This application is a continuation-in-part of U.S. patent application Ser. No. 12/911,857, filed on Oct. 26, 2010, and entitled "Conveyor Apparatus for Unloading Packages From Shipping Containers", the entire contents of which are hereby incorporated by reference herein for all purposes.

TECHNICAL FIELD

The invention relates to a conveyor apparatus for unloading containers, and in particular, a conveyor apparatus removably connectable to an extendable conveyor for unloading shipping containers such as truck trailers.

BACKGROUND

Modern supply networks utilize distribution centers to temporarily store products before distributing them to wholesalers, retailers, or directly to consumers. As a result, distribution centers receive a vast amount of products on a daily basis and many of these products arrive in packages on transport trucks. These packages are unloaded and then placed on a conveyor system, which sorts and routes the packages to different areas within the distribution center for later distribution. In many cases, these packages are unloaded using manual labor.

A common problem with many distribution centers is that employees can injure themselves while unloading the packages from truck trailers. For example, trailers are often filled with packages from the floor to ceiling and employees sometimes strain themselves when repeatedly bending over to pick up the bottommost packages, and/or reaching up to grab the topmost packages. These repeated physical strains can cause short and long-term injuries. Even the seemingly simple task of carrying packages within the trailer can be hazardous, particularly with heavier packages. Accordingly, it is desirable to provide equipment that reduces health and safety concerns associated with unloading trailers.

There have been some attempts to provide equipment that assists employees while loading and unloading packages from trailers. Many of these solutions utilize an extendable conveyor that can be positioned inside the trailer so that an employee can pick and place packages on the extendable conveyor without having to carry the package out of the trailer. The extendable conveyor then transports the package to a conveyor system within the distribution center.

One example of an extendable conveyor is described in U.S. Pat. No. 6,431,346 (Gilmore et al.). The conveyor includes an extendable conveyor section and a user interface section supported in cantilever fashion on the end of the extendable conveyor section. The user interface is vertically adjustable about a horizontal axis and horizontally adjustable about a vertical axis. According to Gilmore et al., providing a user interface section that pivots from side-to-side, and up and down, helps an operator load packages at different lateral positions and different heights within the trailer.

While the user interface section of the Gilmore et al. conveyor moves up and down, employees can still strain themselves when reaching for packages near the floor and ceiling. Furthermore, the entire conveyor, including the user interface section, has limited weight capacity because it is supported in a cantilever fashion. The packages also tend to jam when transitioning from the user interface section to the extendable section, particularly when the user interface section has been pivoted to one side. In some cases, packages might even fall off the conveyor when transitioning from the user interface section to the extendable section.

Accordingly, there is a need for an improved conveyor apparatus, which overcomes one or more of the disadvantages associated with the prior art.

SUMMARY OF THE INVENTION

According to one aspect of the invention, there is provided a conveyor apparatus comprising a frame removably connectable to an extendable conveyor, and a pivoting conveyor coupled to the frame. The pivoting conveyor includes a slewing conveyor section pivotally coupled to the frame for pivotal movement about a generally vertical axis, and a tiltable conveyor section. The tiltable conveyor section has one end pivotally coupled to the slewing conveyor section for pivotal movement about a generally horizontal axis, and an opposing free end shaped for receiving objects. The tiltable conveyor section includes a first conveying surface for conveying the objects between the free end of the tiltable conveyor section and the slewing conveyor section. The slewing conveyor section includes a second conveying surface for conveying the objects between the tiltable conveyor section and the extendable conveyor. The free end of the tiltable conveyor section can be moved from side-to-side by pivoting the slewing conveyor section about the vertical axis. The free end of the tiltable conveyor section can also be moved up and down by pivoting the tiltable conveyor section about the horizontal axis independent of the slewing conveyor section.

The apparatus may further comprise an operator platform coupled to the frame and located below the free end of the tiltable conveyor section for supporting an operator. The operator platform is configured to move vertically relative to the frame so as to position the operator at a user adjustable height. The apparatus may also comprise a platform elevation mechanism coupled between the frame and the operator platform for raising and lowering the operator platform. Furthermore, the apparatus may comprise a safety lock mechanism for securing the operator platform at the user adjustable height. The apparatus may further comprise a conveyor lifting mechanism coupled to the frame and the slewing conveyor section for raising and lowering the pivoting conveyor relative to the frame.

The frame may include a base supported by wheels. At least some of the wheels may be motorized wheels for driving the frame.

The apparatus may also comprise a counter balance mechanism coupled to the slewing conveyor section and the tiltable conveyor section for counteracting the weight of the tiltable conveyor section. In some embodiments, the weight of the tiltable conveyor section creates a first moment of force about the horizontal axis, and the counter balance mechanism may comprise an air cylinder pivotally coupled to the slewing conveyor section and pivotally coupled to the tiltable conveyor section. The air cylinder is configured to apply a force to the tiltable conveyor section so as to create a second moment of force about the horizontal axis that is approximately equal and opposite to the first moment of force.

The apparatus may comprise a first brake assembly coupled to the frame and the slewing conveyor section for selectively inhibiting pivotal movement of the slewing conveyor section about the vertical axis. The apparatus may comprise a second brake assembly coupled to the slewing conveyor section and the tiltable conveyor section for selectively inhibiting pivotal movement of the tiltable conveyor section about the horizontal axis.

The apparatus may also comprise a flexible conveyor extending from the slewing conveyor section toward the extendable conveyor. The flexible conveyor is configured to curve from side-to-side so as to provide a flexible transition zone between the slewing conveyor section and the extendable conveyor when pivoting the slewing conveyor section about the vertical axis.

In some embodiments, the slewing conveyor section conveys packages along a first pivoting longitudinal axis and the extendable conveyor conveys packages along a second fixed longitudinal axis. The flexible conveyor may have a first end proximal to the slewing conveyor section and defining a first transverse axis that remains generally perpendicular to the first pivoting longitudinal axis when the slewing conveyor section pivots about the vertical axis, and a second end proximal to the extendable conveyor and defining a second transverse axis that remains generally perpendicular to the second fixed longitudinal axis when the slewing conveyor section pivots about the vertical axis. The apparatus may also comprise an anchor bar removably coupled to the frame and the second end of the flexible conveyor so as to maintain alignment of the second end of the flexible conveyor with the second fixed longitudinal axis.

The flexible conveyor may include a pair of side frames spaced apart from each other. Each side frame includes a plurality of interconnected links configured so that each side frame can expand and contract independently of the other side frame so as to provide the flexible transition zone between the slewing conveyor section and the extendable conveyor. The flexible conveyor may also include a plurality of rollers interposed between the side frames. The rollers are rotatably coupled to opposing pairs of the interconnected links on each side frame. The rollers are configured to convey objects between the slewing conveyor section and the extendable conveyor.

The flexible conveyor may extend outward from the slewing conveyor section and may decline toward the extendable conveyor so as to gravity feed objects from the slewing conveyor section to the extendable conveyor. Furthermore, the frame may include a conveyor lifting mechanism for raising and lowering the pivoting conveyor relative to the frame so as to maintain a declining slope from the slewing conveyor section to the extendable conveyor.

According to another aspect of the invention, there is provided a conveyor apparatus for loading and unloading objects from a shipping container. The conveyor apparatus comprises a frame removably connectable to an extendable conveyor, and a pivoting conveyor coupled to the frame. The pivoting conveyor includes a slewing conveyor section pivotally coupled to the frame for pivotal movement about a generally vertical axis, and a tiltable conveyor section. The tiltable conveyor section has one end pivotally coupled to the slewing conveyor section for pivotal movement about a generally horizontal axis, and an opposing free end shaped for receiving the objects being loaded into or unloaded from the shipping container. The tiltable conveyor section includes a first conveying surface for conveying the objects between the free end of the tiltable conveyor section and the slewing conveyor section. The slewing conveyor section includes a second conveying surface for conveying the objects between the tiltable conveyor section and the extendable conveyor. The free end of the tiltable conveyor section can be moved from side-to-side by pivoting the slewing conveyor section about the vertical axis. The free end of the tiltable conveyor section can also be moved up and down by pivoting the tiltable conveyor section about the horizontal axis independent of the slewing conveyor section. The apparatus also comprises an operator platform coupled to the frame and located below the free end of the tiltable conveyor section for supporting an operator while loading the objects into or unloading the objects from the shipping container. The operator platform is configured to move vertically relative to the frame so as to position the operator at a user adjustable height.

According to another aspect of the invention, there is provided a conveyor apparatus comprising a frame removably connectable to an extendable conveyor, and a pivoting conveyor coupled to the frame for conveying objects to or from the extendable conveyor. The pivoting conveyor includes a first pivotable conveyor section having a free end shaped for supporting objects and having a first conveying surface for conveying objects to or from the free end. The first pivotable conveyor section is pivotally coupled to the frame about a vertical axis for pivoting the free end from side-to-side and pivotally coupled to the frame about a first horizontal axis for pivoting the free end up and down. The pivoting conveyor also includes a second non-pivotable conveyor section having a second conveying surface for conveying the objects to or from the first pivotable conveyor section, and a plurality of transition plates located between the first and second conveying surfaces for transferring objects therebetween. The transition plates include a fixed transition plate located adjacent to the second conveying surface, and a shuttling transition plate located adjacent to the first conveying surface and configured to move laterally relative to the first conveying surface as the first pivotable conveyor section pivots about the vertical axis.

According to another aspect of the invention, there is provided a conveyor apparatus comprising a frame removably connectable to an extendable conveyor, and a pivoting conveyor coupled to the frame for conveying objects to or from the extendable conveyor. The pivoting conveyor includes a first pivotable conveyor section having a free end shaped for supporting objects and having a first conveying surface for conveying objects to or from the free end. The first pivotable conveyor section is pivotally coupled to the frame about a vertical axis for pivoting the free end from side-to-side and pivotally coupled to the frame about a first horizontal axis for pivoting the free end up and down. The pivoting conveyor also includes a second non-pivotable conveyor section having a second conveying surface for conveying the objects to or from the first pivotable conveyor section, and a third tiltable conveyor section having a third conveying surface for conveying the objects between the second non-pivoting conveyor and the extendable conveyor. The third tiltable conveyor section has a rear end for being connected to the extendable conveyor. The third tiltable conveyor section is pivotally coupled to the frame about a second horizontal axis for pivoting the rear end up and down.

According to another aspect of the invention, there is provided a conveyor apparatus comprising a frame removably connectable to an extendable conveyor, and a pivoting conveyor coupled to the frame for pivotal movement about a generally vertical axis and for pivotal movement about a generally horizontal axis. The pivoting conveyor has a free end shaped for receiving objects. The pivoting conveyor includes at least one conveying surface for conveying the objects between the free end and the extendable conveyor. Furthermore, the free end can be moved from side-to-side by pivoting the pivoting conveyor about the vertical axis, and the free end can be moved up and down by pivoting the pivoting conveyor about the horizontal axis. The pivoting conveyor also has a weight. The conveyor apparatus also includes a counter balance mechanism coupled to the pivoting conveyor for counteracting the weight of the pivoting conveyor.

Other aspects and features of the invention will become apparent, to those ordinarily skilled in the art, upon review of the following description of some exemplary embodiments.

BRIEF DESCRIPTION OF THE DRAWINGS

The drawings included herewith are for illustrating various examples of methods and apparatus of the present specification and are not intended to limit the scope of what is taught in any way. In the drawings:

FIG. 20 is a perspective view of the conveyor apparatus of FIG. 14 reconfigured for unloading a shipping container.

DETAILED DESCRIPTION OF THE INVENTION

Figure 1:
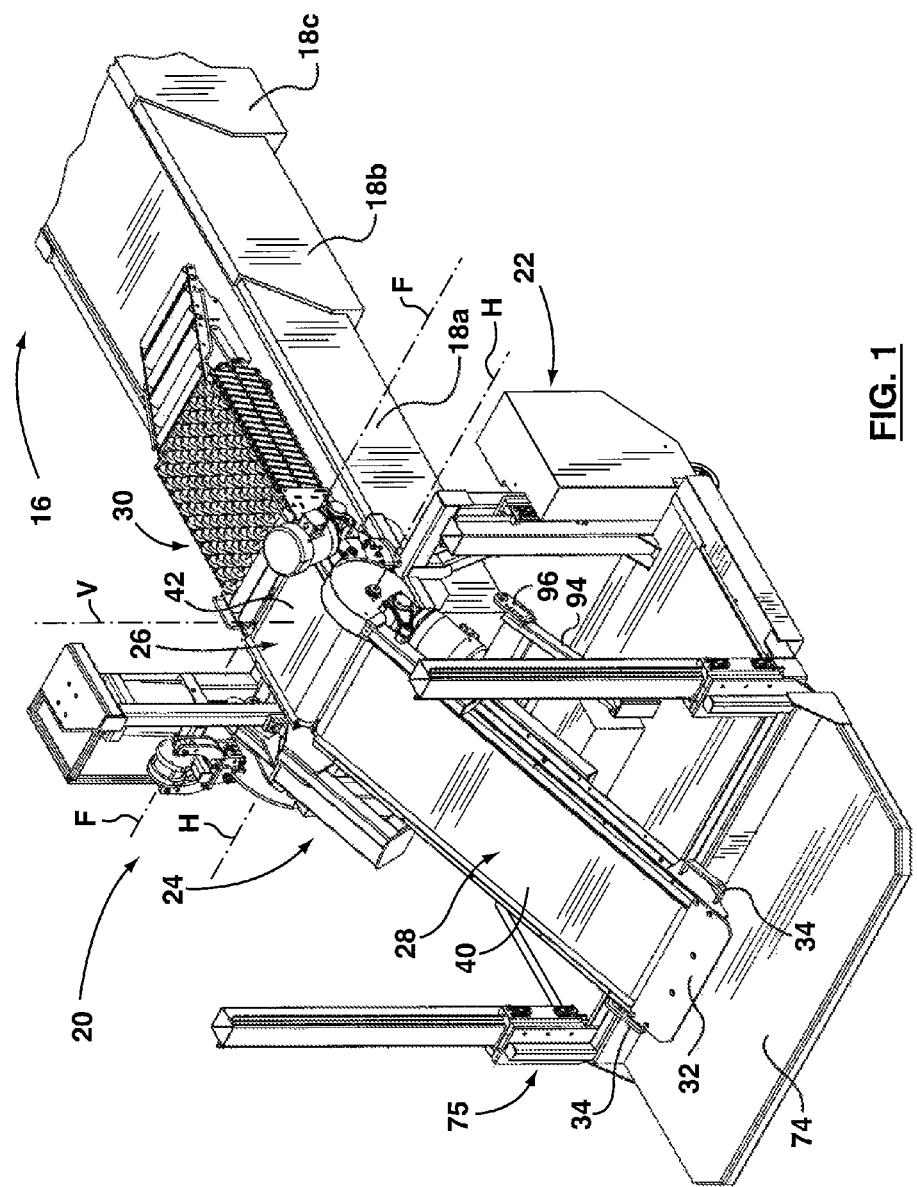
FIG. 1 is a perspective view of a conveyor apparatus according to an embodiment of the present invention.

Referring to FIG. 1, illustrated therein is a conveyor apparatus 20 made in accordance with an embodiment of the present invention. Generally, an operator uses the conveyor apparatus 20 to unload packages or other objects from a shipping container, such as a truck trailer, and onto an extendable conveyor 16, which may route the packages to different areas in a facility such as a distribution center. The extendable conveyor 16 includes three sections 18a, 18b, and 18c telescopically nested within each other, and a conveyor belt extending along the sections 18a, 18b, and 18c for conveying packages from the first section 18a toward the third section 18c. As known in the art, the length of the belt increases or decreases as the sections 18a, 18b, and 18c extend and retract from each other. While the illustrated extendable conveyor has three sections, it should be understood that the extendable conveyor may have a different number of sections, and that the conveyor apparatus 20 may be used with other types of conveyors, such as extendable roller conveyors, fixed length belt conveyors, and the like.

The conveyor apparatus 20 includes a frame 22 connectable to the extendable conveyor 16, a pivoting conveyor 24 pivotally coupled to the frame 22 for unloading packages from the truck trailer, and a flexible conveyor 30 extending from the pivoting conveyor 24 toward the extendable conveyor 16 for conveying packages from the pivoting conveyor 24 to the extendable conveyor 16. While the conveyor apparatus 20 typically includes guarding for protecting the operator and addressing other safety concerns, the guarding is not shown in the illustrated embodiment for clarity.

The pivoting conveyor 24 includes two conveyor sections, namely, a generally horizontal slewing conveyor section 26 pivotally coupled to the frame 22 for pivotal movement about a vertical axis V, and a tiltable conveyor section 28 having a proximal end pivotally coupled to the slewing conveyor section 26 for pivotal movement about a horizontal axis H. The tiltable conveyor section 28 also has an opposing free end 32 shaped for receiving packages being unloaded from the truck trailer. Generally, the horizontal axis H of the tiltable conveyor section 28 is located between the free end 32 of the tiltable conveyor section 28 and the vertical axis V of the slewing conveyor section 26.

Each of the conveyor sections 26 and 28 have conveying surfaces for conveying packages from the free end 32 toward the extendable conveyor 16. In particular, the tiltable conveyor section 28 includes a first conveying surface 40 for conveying packages from the free end 32 toward the slewing conveyor section 26, and the slewing conveyor section 26 includes a second conveying surface 42 for conveying packages from the tiltable conveyor section 28 toward the extendable conveyor 16.

In the illustrated embodiment, the conveying surfaces 40 and 42 are the top surfaces of endless conveyor belts, which may be made from rubber or another suitable material. Each endless belt is reeved around rollers and is powered by an electric motor coupled to one of the rollers as will be described below. In other embodiments, the conveying surfaces 40 and 42 may have other configurations, such as the top surfaces of powered rollers, plastic belt conveyors, slat conveyors, and the like.

Generally, pivoting the slewing conveyor section 26 from side-to-side about the vertical axis V adjusts the lateral position of the free end 32 of the tiltable conveyor section 28 so that an operator can place the free end 32 at a lateral position corresponding to a package being unloaded from a truck trailer. Furthermore, pivoting the tiltable conveyor section 28 up and down about the horizontal axis H adjusts the vertical position of the free end 32 of the tiltable conveyor section 28 so that an operator can place the free end 32 at a height corresponding to a package being unloaded from the truck trailer. Moving the free end 32 to various positions corresponding to each individual package generally reduces physical strains that an operator might sustain if the free end had a fixed position.

In the illustrated embodiment, the operator manually moves the free end 32, for example, by grasping handles 34 located proximal to the free end 32 on the tiltable conveyor section 28. After moving the free end 32 to a desired position, the tiltable conveyor section 28 and the slewing conveyor section 26 may be locked in position to inhibit further pivotal movement about the vertical axis V and/or the horizontal axis H, as will be described below. In other embodiments, the apparatus may include actuators (e.g. hydraulic, electronic, or pneumatic actuators) that provide powered movement of the free end 32. For example, a first actuator may be configured to pivot the tiltable conveyor section 28 about the horizontal axis H, and a second actuator may be configured to pivot the slewing conveyor section 26 about the vertical axis V.

Figure 2:
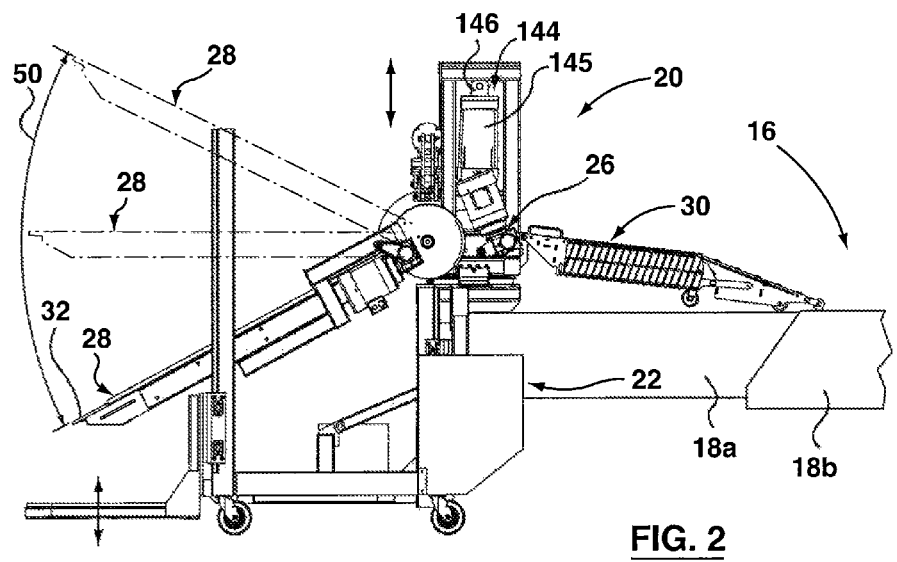
FIG. 2 is a side elevation view of the conveyor apparatus of FIG. 1, in which a tiltable conveyor section of the pivoting conveyor pivots up and down between three positions.

Referring to FIG. 2, the tiltable conveyor section 28 pivots up and down within a range of elevations corresponding to the elevation angle 50. As shown, the elevation angle 50 may extend from between about −35° to about +35° from the horizontal. In other embodiments, the elevation angle 50 may be different.

Figure 3:
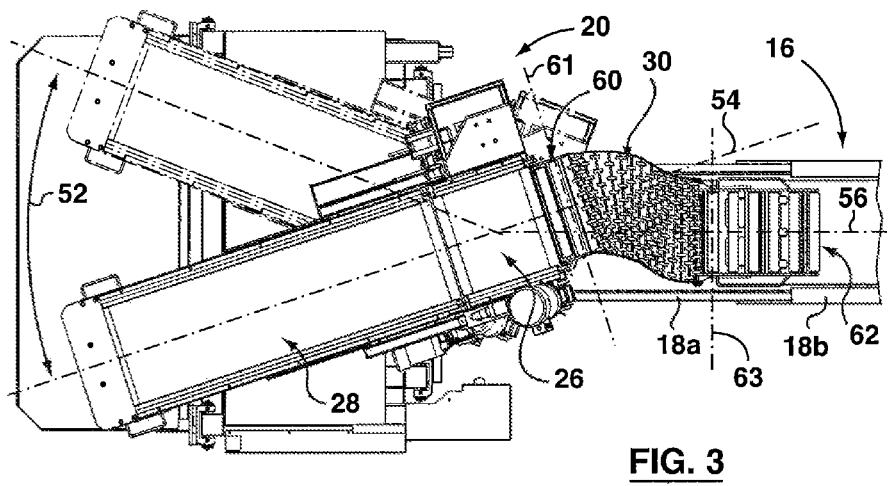
FIG. 3 is a top plan view of the conveyor apparatus of FIG. 1, in which the pivoting conveyor is pivoting from side-to-side between two positions.

Referring to FIG. 3, the slewing conveyor section 26 pivots from side-to-side through a range of positions corresponding to the azimuth angle 52. As shown, the azimuth angle 52 may be about 40°, namely, between −20° and +20° from the longitudinal axis 56. In other embodiments, the azimuth angle 52 may be different.

As shown in FIG. 3, the tiltable conveyor section 28 generally pivots with the slewing conveyor section 26 about the vertical axis V. In other words, when pivoting the slewing conveyor section 26 about the vertical axis V, the entire pivoting conveyor 24 pivots as a unit, including both the tiltable conveyor section 28 and the slewing conveyor section 26.

In contrast, the tiltable conveyor section 28 generally pivots about the horizontal axis H independently of the slewing conveyor section 26. In other words, when pivoting the tiltable conveyor section 28, the slewing conveyor section 26 maintains a generally horizontal orientation and does not tilt up or down.

Maintaining the horizontal orientation of the slewing conveyor section 26 tends to provide a gradual transition for packages moving from the pivoting conveyor 24 to the flexible conveyor 30. Without the horizontal slewing conveyor section 26, packages might be subject to a sudden change in inclination when moving from the pivoting conveyor 24 to the flexible conveyor 30. For example, if the tiltable conveyor section 28 were tilted downward to the free end 32, and the flexible conveyor 30 were tilted downward to the extendable conveyor 16, packages being propelled upward on the pivoting conveyor 24 would suddenly change direction and would begin falling downward on the flexible conveyor 30. This sudden change of direction might damage packages, or cause them to jam or fall off the conveyors, particularly when the slewing conveyor section 26 is pivoted to one side. The horizontal slewing conveyor section 26 provides a more gradual change in inclination/declination by remaining horizontal, which tends to reduce the likelihood of damaging packages or causing packages to jam or fall off the conveyors.

Referring again to FIG. 1, the flexible conveyor 30 is configured to convey packages from the slewing conveyor section 26 to the extendable conveyor 16. In the illustrated embodiment, the flexible conveyor 30 is a gravity feed conveyor and includes a plurality of rollers extending from the slewing conveyor section 26 and downward to the extendable conveyor 16. Accordingly, packages leaving the powered conveying surface 42 of the slewing conveyor section 26 travel down the flexible conveyor 30 toward the extendable conveyor 16 under the force of gravity. In other embodiments, the flexible conveyor 30 may include powered rollers, or another powered conveying surfaces instead of being a gravity feed conveyor.

In the illustrated embodiment, the flexible conveyor 30 is pivotally coupled to the slewing conveyor section 26 along a second horizontal axis F, which allows the flexible conveyor 30 to pivot up and down relative to the pivoting conveyor 24. In other embodiments, the flexible conveyor 30 may be rigidly coupled to the slewing conveyor section 26.

The flexible conveyor 30 generally provides a flexible transition zone between the slewing conveyor section 26 and the extendable conveyor 16, which allows packages to gradually change directions when transitioning from the slewing conveyor section 26 to the extendable conveyor 16. For example, referring to FIG. 3, the slewing conveyor section 26 generally conveys packages along a first pivoting longitudinal axis 54, and the extendable conveyor 16 conveys packages along a second fixed longitudinal axis 56. When the slewing conveyor section 26 pivots from side-to-side, the first pivoting longitudinal axis 54 pivots relative to the second fixed longitudinal axis 56, which would normally represent a sudden change in direction for packages transitioning from the slewing conveyor section 26 to the extendable conveyor 16. The flexible conveyor 30 compensates for this change in direction by curving to one side, which gradually turns the packages along the flexible conveyor 30.

More particularly, the flexible conveyor 30 has a first end 60 proximal to the slewing conveyor section 26 and a second end 62 proximal to the extendable conveyor 16. The first end 60 defines a first transverse axis 61, which remains generally perpendicular to the first pivoting longitudinal axis 54 corresponding to the slewing conveyor section 26. The second end 62 defines a second transverse axis 63, which remains generally perpendicular to the second fixed longitudinal axis 56 corresponding to the extendable conveyor 16. The middle of the flexible conveyor 30 between the two ends 60 and 62 curves from side-to-side to maintain alignment of the first end 60 with the first pivoting longitudinal axis 54, and alignment of the second end 62 with the second fixed longitudinal axis 56. For example, as shown in FIG. 3, when the slewing conveyor section 26 pivots counter-clockwise, the middle of the flexible conveyor 30 curves into an S-shape so as to maintain alignment of the first end 60 with the first pivoting longitudinal axis 54, and alignment of the second end 62 with the second fixed longitudinal axis 56.

Without the flexible conveyor 30, packages transitioning from the slewing conveyor section 26 to the flexible conveyor 30 might jam due to the sudden change in direction, particularly when the slewing conveyor section 26 pivots to one side. In some cases, packages might even fall over the edge of the extendable conveyor 16 during the transition. The flexible conveyor 30 tends to prevent jams and fallen packages by providing a flexible transition zone that conveying packages from the slewing conveyor section 26 to the extendable conveyor 16.

It will be understood that when the slewing conveyor section 26 has not been pivoted to either side, the first pivoting longitudinal axis 54 will be generally co-linear to the second fixed longitudinal axis 56, and the flexible conveyor 30 will be generally straight.

Referring now to FIGS. 4-7, the frame 22, the slewing conveyor section 26, the tiltable conveyor section 28, and the flexible conveyor 30 will now be described in further detail.

Figure 4:
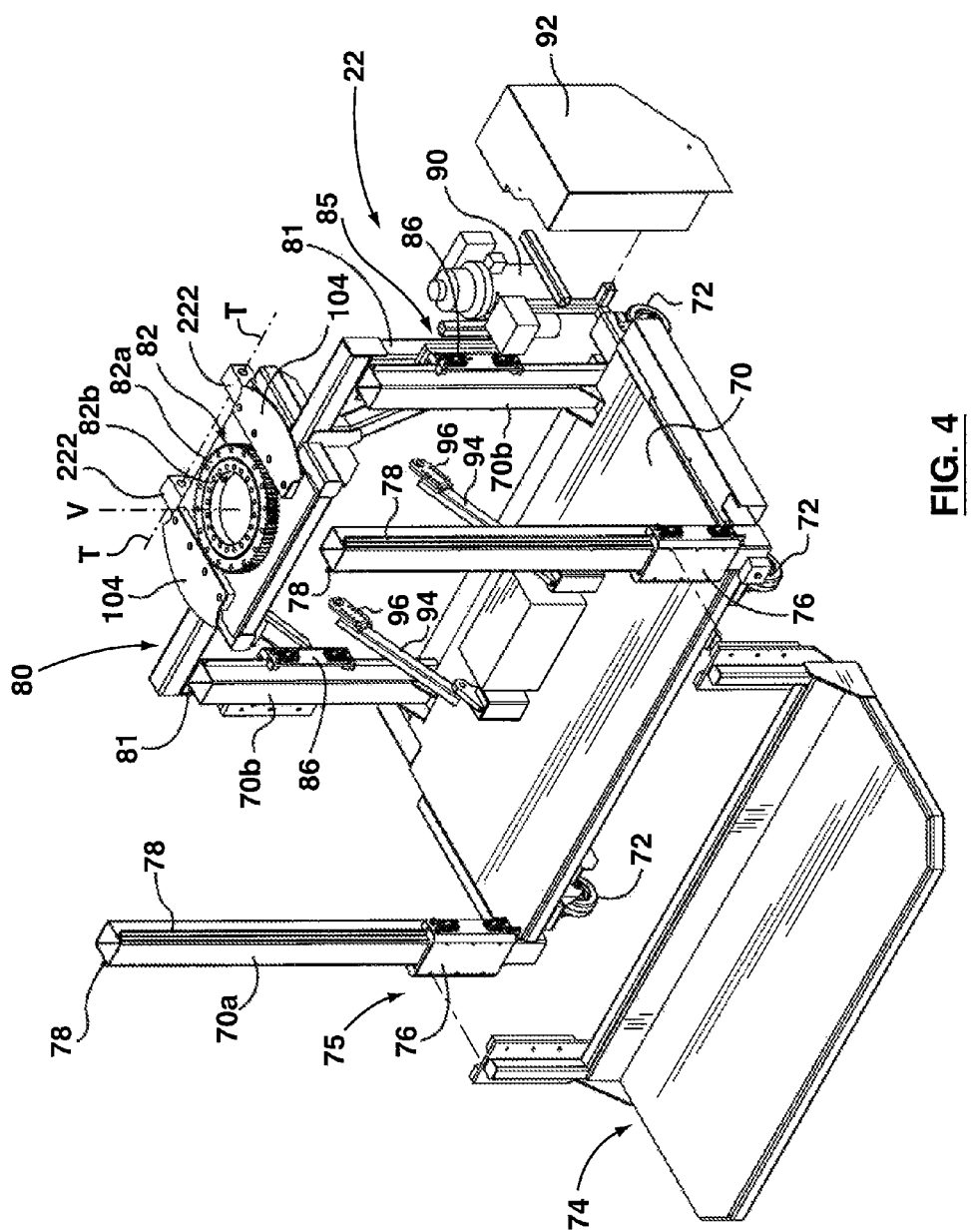
FIG. 4 is an exploded perspective view of the frame including a slewing bearing for attachment to a slewing conveyor section of the pivoting conveyor.

Referring to FIG. 4, the frame 22 includes a base 70 supported by wheels 72, which may be caster wheels. Generally, the wheels at least partially support the conveyor apparatus 20, and enable the conveyor apparatus 20 to carry heavier packages in comparison to prior art cantilever supported conveyors, such as the extendable conveyor of Gilmore et al. In some embodiments, the wheels 72 may be powered and the conveyor apparatus 20 may be operated as a drivable vehicle.

The conveyor apparatus 20 also includes an operator platform 74 coupled to the frame 22 and located below the free end 32 of the tiltable conveyor section 28 (see FIG. 1). Generally, the operator platform 74 is configured to support an operator while unloading packages from the truck trailer and onto the tiltable conveyor section 28. In some embodiments, the top surface of the operator platform 74 may be covered with an anti-fatigue rubber mat so as to reduce operator fatigue.

The operator platform 74 is coupled to two front posts 70a that extend upwardly from the base 70 of the frame 22. More particularly, the conveyor apparatus 20 includes a platform elevation mechanism 75 for coupling the operator platform 74 to the front posts 70a. The platform elevation mechanism 75 allows the operator platform 74 to move up and down along the posts 70a so as to position the operator at a user adjustable height while unloading packages from the truck trailer. For example, the operator platform 74 can be positioned by the operator at a height that allows the operator to ergonomically unloading packages from the truck trailer without significant physical strains.

The platform elevation mechanism 75 includes an elevation actuator, such as a hydraulic cylinder (not shown) located within the front posts 70a and coupled to the operator platform 74, for example using a cable and pulley (not shown) that are also located within the front posts 70a.

The platform elevation mechanism 75 also includes lift brackets 76 for slidably supporting the operator platform 74 on the front posts 70a. The lift brackets 76 are generally coupled to corresponding mounting plates on the operator platform 74. Each lift bracket 76 has a generally C-shaped cross-section sized to fit around a respective post 70a, and two grooves that receive corresponding protruding edges 78 on the sides the respective post 70a. The grooves and protruding edges 78 cooperate to support and guide the operator platform 74 as it moves up and down along the posts 70a. Each lift bracket 76 may also include rollers that engage the edges 78 to facilitate sliding movement up and down the front posts 70a. In other embodiments, the operator platform 74 may be supported in other ways, and may be raised and lowered using other actuators, such as pneumatic or electric actuators.

The platform elevation mechanism 75 also includes a safety lock mechanism (not shown) for securing the operator platform 74 at a specific height, for example, in the event that the elevation actuator fails. In some embodiments, the safety lock mechanism includes a hydraulic cylinder (not shown) having an operating valve and a down flow restrictor for preventing sudden movements of the operator platform 74, such as falls due to a failure. The safety lock mechanism may also include a redundant load chain (not shown) for backing up cable and wire rope failure of the elevation actuator. Furthermore, the safety lock mechanism may include a drop safety lock mechanism (not shown) located on the cylinder posts to protect against mechanical failure of the chain and cylinder mechanism. The drop safety lock mechanism may include a ratchet (not shown) that engages a corresponding set of teeth (not shown) extending vertically along one of the front posts 70a. Alternatively, the drop safety lock mechanism may be in the form of a locking pin (not shown) extending through one of a plurality of apertures (not shown) in the front posts 70a so as to support the lift brackets 76.

The conveyor apparatus 20 also includes a lift frame 80 coupled to a pair of rear posts 70b of the frame 22 for supporting the slewing conveyor section 26 of the pivoting conveyor 24. In particular, the lift frame 80 includes a pair of posts 81 parallel to the rear posts 70b and slidably coupled thereto using lift brackets 86, which are generally similar to the lift brackets 76.

A slewing bearing 82 is attached to the top of the lift frame 80 for pivotally coupling the slewing conveyor section 26 to the frame 22. In particular, the slewing bearing 82 includes an outer ring 82a fastened to a corresponding bearing spacer 84 (shown in FIG. 5), which is fastened to the underside of the slewing conveyor section 26. As known in the art, the outer ring 82a of the slewing bearing 82 is rotatably supported on an inner ring 82b through a plurality of ball bearings (not shown), which allows smooth rotation of the slewing bearing 82. The central axis of the slewing bearing 82 generally defines the vertical axis V.

The conveyor apparatus 20 also includes a conveyor lifting mechanism 85 coupled between the rear posts 70b and the posts 81 of the lift frame 80 for raising and lowering the pivoting conveyor 24 relative to the frame 22. The conveyor lifting mechanism 85 is similar in many respects to the platform elevation mechanism 75, and includes a lifting actuator (not shown) and lift brackets 86 (similar to lift brackets 76) for slidably supporting the lift frame 80 on the rear posts 70b.

The lifting mechanism 85 may be used to raise and lower the slewing conveyor section 26 of the pivoting conveyor 24 so as to maintain a gradual declining slope from the slewing conveyor section 26 to the extendable conveyor 16. This may be useful when the flexible conveyor 30 is a gravity feed conveyor, which typically requires at least a moderate slope to convey packages toward the extendable conveyor 16.

An operator might also raise or lower the slewing conveyor section 26 in order to position the free end 32 of the tiltable conveyor section 28 at a specific height for unloading packages. In particular, it might be desirable to raise the slewing conveyor section 26 in order to reach packages located near the ceiling of a truck trailer, or to lower the slewing conveyor section 26 in order to reach packages located near the floor.

The conveyor apparatus 20 may also include controls (not shown) for operating the platform elevation mechanism 75 and the conveyor lifting mechanism 85. The controls may be located on the frame 22 so that an operator standing on the operator platform 74 can control the vertical position of both the operator platform 74 and the pivoting conveyor 24. For example, the controls may be located on one or both of the front posts 70a. Alternatively, the controls may be operated via a wired or wireless remote.

The conveyor apparatus 20 also includes a power unit 90 mounted to the frame 22 for providing power to various components on the conveyor apparatus 20, such as the elevation mechanism 75, the lifting mechanism 85, brake calipers 102 and 142, motors 118 and 168, and the like. The power unit 90 may include a hydraulic pump, an electrical power supply, a pneumatic supply, and/or another type of power unit. The power unit 90 may be enclosed by a removable housing 92.

A link bar assembly 94 is also pivotally coupled to the base 70 for connecting the frame 22 to the extendable conveyor 16. For example, as shown in FIG. 1, the link bar assembly 94 may be coupled to the lower front end of the first section 18a of the extendable conveyor 16 using mounting blocks 96. Generally, the frame 22 remains coupled to the extendable conveyor 16 during use, even after unloading one truck trailer and then moving into a subsequent truck trailer. However, it will be understood that the mounting blocks 96 are removably coupled to the extendable conveyor 16 so that the conveyor apparatus 20 can be detached from one extendable conveyor and then attached to a different extendable conveyor.

Figure 5:
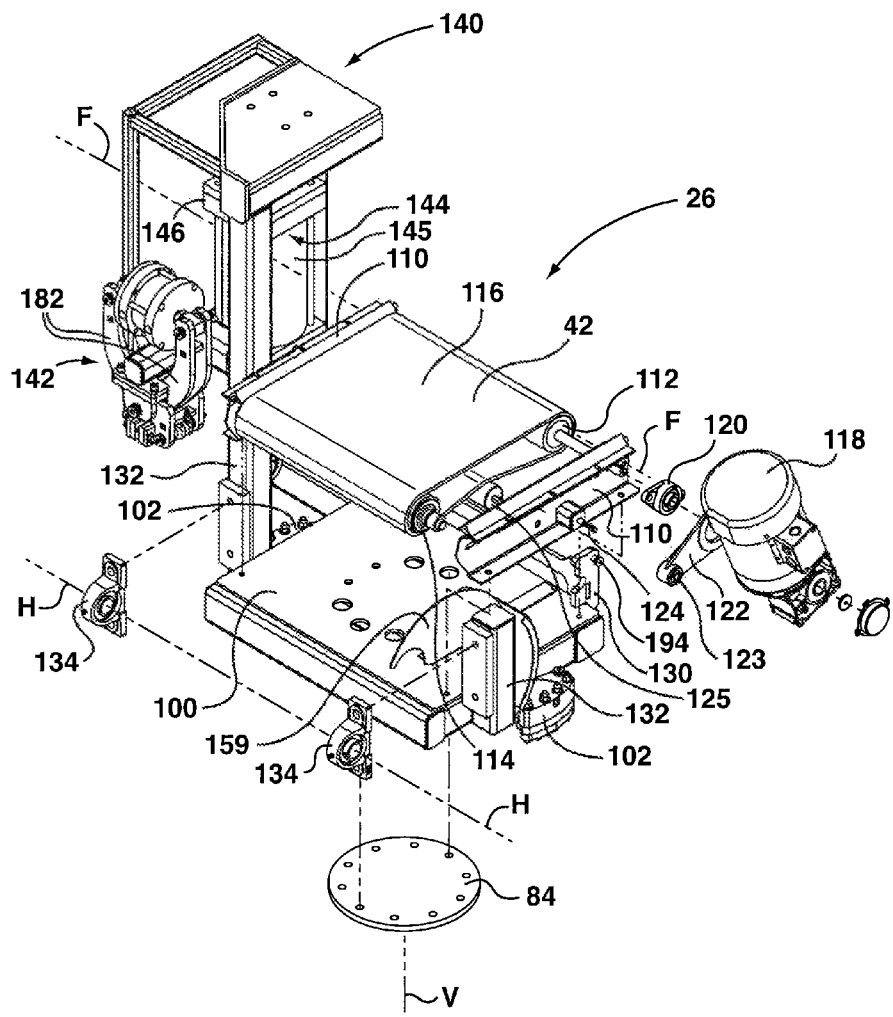
FIG. 5 is an exploded perspective view of the slewing conveyor section of the pivoting conveyor.

Referring now to FIG. 5, the slewing conveyor section 26 includes a base 100 that supports the conveying surface 42 and other components of the slewing conveyor section 26. The underside of the base 100 is fastened to the bearing spacer 84, which is in turn fastened to the slewing bearing 82 (shown in FIG. 4) for pivotally coupling the slewing conveyor section 26 to the frame 22 along the vertical axis V. This allows an operator to pivot the slewing conveyor section 26 about the vertical axis V so as to position the free end 32 of the tiltable conveyor section 28 in a desired lateral position.

A pair of brake calipers 102 is attached to the underside of the base 100 for locking the slewing conveyor section 26 in a desired position. The brake calipers 102 releasably engage a corresponding pair of brake discs 104 (shown in FIG. 4) located on the top of the lift frame 80 on opposing sides of the slewing bearing 82. The brake calipers 102 disengage the brake discs 104 while pivoting the slewing conveyor section 26 about the vertical axis V. When the slewing conveyor section 26 has been rotated to a desired position, the brake calipers 102 frictionally engage the brake discs 104 and inhibit further movement.

In the illustrated embodiment, the brake calipers 102 are pneumatically operated. In other embodiments, the brake calipers 102 may be powered by alternative power sources, such as hydraulic or electrical energy. Furthermore, in other embodiments, the brake calipers 102 and the brake discs 104 may be replaced by other types of brake assemblies, such as drum brakes, electromagnetic brakes, and the like.

An operator may control actuation of the brake calipers 102. For example, the handles 34 on the tiltable conveyor section 28 may include a brake release button 106 (shown in FIG. 6). Pressing the brake release button 106 disengages the brake calipers 102 to allow pivotal movement of the slewing conveyor section. Letting go of the brake release button 106 engages the brake calipers 102 to inhibit further movement. In other embodiments, the brake release button 106 may be replaced by another brake release control, such as a laser sensor, pressure sensor, proximity sensor, and the like.

The slewing conveyor section 26 also includes two spaced apart conveyor side frames 110 attached to the top surface of the base 100 using bolts, screws or another fastener. The side frames 110 generally support components for providing the conveying surface 42, including a driven roller 112, an idler roller 114, a belt 116 reeved around the rollers 112 and 114, and a conveyor motor 118 for rotating the driven roller 112 and the belt 116.

The two rollers 112 and 114 are rotatably supported and spaced apart by the side frames 110. In particular, the rear of the side frames 110 have grooves (not shown) for receiving the ends of the driven roller 112, and the front of the side frames 110 have apertures for receiving the ends of the idler roller 114. The right end of the driven roller (as viewed in FIG. 5) protrudes beyond the right side frame 110, through a shaft bearing 120, and is coupled to the motor 118 so that rotation of the motor 118 also rotates the driven roller 112. The shaft bearing 120 is also fastened to the right side frame 110 to partially support the driven roller 112. There is also a corresponding shaft bearing (not shown) on the other end of the driven roller 112.

The right side frame 110 also supports the conveyor motor 118. In particular, the motor 118 has an arm 122 with an aperture 123 therein that receives a bolt 124 extending outward from the right side frame 110. Furthermore, the housing of the shaft bearing 120 also partially supports the motor 118.

As described above, the belt 116 is reeved around the rollers 112 and 114 such that the belt 116 rotates when the motor 118 drives the driven roller 112. A tensioner roller 125 may be located between the rollers 112 and 114 for providing tension to the belt 116 and to prevent slippage. The side frames 110 support the tensioner roller 125 in a similar way as the idler roller 114.

The slewing conveyor section 26 also includes a rear bracket 130 attached to the base 100 and extending upward therefrom for coupling the flexible conveyor 30 to the slewing conveyor section 26, and two side posts 132 attached to the sides of the base 100 and extending upward therefrom. Two pillow block bearings 134 are fastened to the front faces of the posts 132 for pivotally coupling the tiltable conveyor section 28 to the slewing conveyor section 26 about the horizontal axis H.

A sub-frame 140 is attached to the left side post 132 (as viewed in FIG. 5). The sub-frame 140 supports a brake caliper 142 for locking the tiltable conveyor section 28 in a particular angular position relative to the slewing conveyor section 26, and a counter balance mechanism 144 for counterbalancing the tiltable conveyor section 28 about the horizontal axis H, as will be described below.

Figure 6:
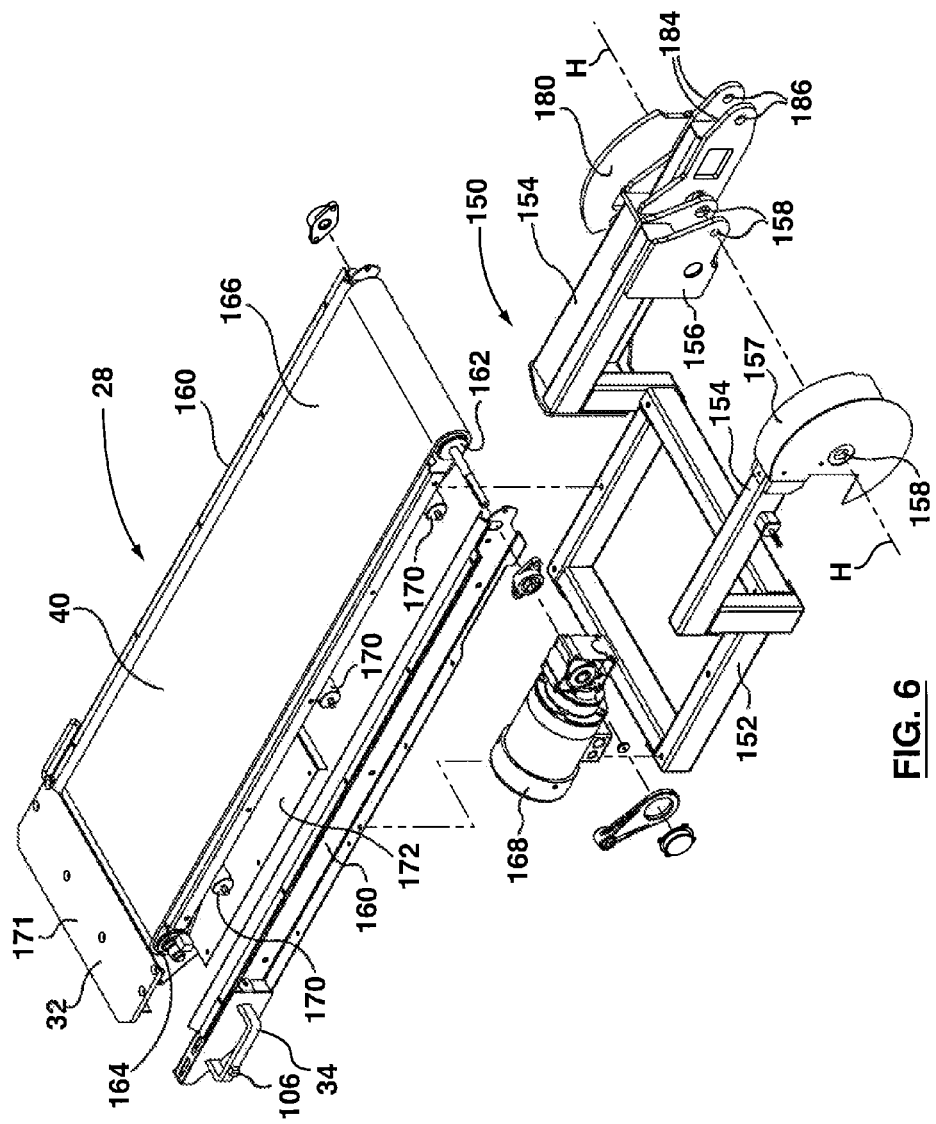
FIG. 6 is an exploded perspective view of the tiltable conveyor section of the pivoting conveyor.

Referring now to FIG. 6, the tiltable conveyor section 28 includes a support frame 150 for attaching the tiltable conveyor section 28 to the slewing conveyor section 26 and for supporting other components of the tiltable section. The support frame 150 includes a base portion 152 and two spaced apart support members 154 extending upward and rearward from the base portion 152 (as viewed in FIG. 6).

The rearward ends of the support members 154 have brackets 156 and 157. The first bracket 156 includes two spaced apart plates on opposing sides of the right support member 154 (as viewed in FIG. 6). The second support bracket 157 includes a circular casing with a rectangular cutout for receiving the end of a motor 168. Both brackets 156 and 157 have aligned apertures 158 therein for receiving respective pins (not shown), which extend through the pillow block bearings 134 of the slewing conveyor section 26 (shown in FIG. 5) so as to pivotally couple the tiltable conveyor section 28 to the slewing conveyor section 26 about the horizontal axis H. The apertures 158, pins and pillow block bearings 134 generally define the horizontal axis H.

Referring to FIGS. 5 and 6, the circular casing of the second bracket 157 mates with a corresponding casing 159 on the right side post 132 of the slewing conveyor section 26 (as viewed in FIG. 6). These circular casings tend to help conceal and protect the pins.

Two side frames 160 are attached to base 152 for supporting components that provide the conveying surface 40, which includes a driven roller 162, an idler roller 164, a belt 166 reeved around the rollers 162 and 164, and a motor 168 for rotating the driven roller 162 and the belt 166. The rollers 162 and 164, the belt 166, and the motor 168 are generally similar to the rollers 112 and 114, and the belt 116 and the motor 118 of the slewing conveyor section 26 and are assembled in a similar fashion. One difference is that the conveying surface 40 includes three tension rollers 170 for tensioning the belt 166.

The free end 32 of the tiltable conveyor section 28 includes a lip plate 171 slightly spaced apart from the end of the belt 166. A panel 172 attached to the underside of the side frames 160 supports the lip plate 171. The lip plate 171 may be made from Ultra-High Molecular Weight Polyethylene (UHMW), or other suitable materials such as metal or other plastics.

Referring to FIGS. 5 and 6, and as previously described, the sub-frame 140 of the slewing conveyor section 26 includes a brake caliper 142 and a counter balance mechanism 144 for controlling movement of the tiltable conveyor section 28.

The brake caliper 142 (shown in FIG. 5) releasably engages a brake disc 180 (shown in FIG. 6) attached to the end of the right support member 154 (as viewed in FIG. 6) and is located on the outside surface thereof. When the brake caliper 142 disengages the brake disc 180, the tiltable conveyor section 28 can pivot up and down about the horizontal axis H. When the tiltable conveyor section 28 has been pivoted to a desired position, the brake caliper 142 frictionally engages the brake disc 180 so as to inhibit further movement. The brake release button 106 located on the handle 34 may control operation of the brake caliper 142. In other embodiments, the brake release button 106 may be replaced by another brake release control, such as a laser sensor, pressure sensor, proximity sensor, and the like.

The brake caliper 142 and brake disc 180 are generally similar to the brake calipers 102 and brake discs 104. One difference is that the brake caliper 142 includes linkages 182 for amplifying the force of the brake caliper 142 so as to increase the frictional force between the calipers and the brake disc 180. This increased frictional force helps support the weight of the tiltable conveyor section 28 in addition to inhibiting movement thereof. The brake calipers 102 do not include the linkages 182, because the brake calipers 102 inhibit movement of the slewing conveyor section 26, but do not significantly support the weight of the slewing conveyor section 26.

In other embodiments, the brake caliper 142 and brake disc 180 may be replaced by other types of brake assemblies, such as drum brakes, electromagnetic brakes, and the like.

In the illustrated embodiment, the counter balance mechanism 144 comprises an air cylinder 145 (shown in FIGS. 2 and 5) pivotally coupled to the sub-frame 140 and the tiltable conveyor section 28. The air cylinder 145 generally applies a force that counter-balances the weight of the tiltable conveyor section 28 so that the tiltable conveyor section 28 feels almost weightless when pivoting the tiltable conveyor section 28 up and down about the horizontal axis H.

The air cylinder 145 includes a casing pivotally coupled to the sub-frame 140 through a cylinder mount 146 (shown in FIG. 5), and a rod (not shown) telescopically mounted within the casing and having a distal end pivotally coupled to a pair of extension brackets 184 (shown in FIG. 6) extending rearward from the end of the right support member 154 (as viewed in FIG. 6). The extension brackets 184 have apertures 186 for receiving a pin (not shown) so as to pivotally couple the rod of the air cylinder 145 to the tiltable conveyor section 28.

In use, the tiltable conveyor section 28 has a weight that creates a first moment of force about the horizontal axis H, and the rod of the counter balance mechanism 144 applies a downward force on the extension brackets 184, which creates a second moment of force about the horizontal axis H that is approximately equal and opposite to the first moment of force. As such, the second moment of force created by the air cylinder 145 counteracts the first moment of force created by the weight of the tiltable conveyor section 28 such that an operator can apply a small force at the handles 34 in order to pivot the tiltable conveyor section 28 up or down.

In the illustrated embodiment, the air cylinder 145 applies a predetermined amount of pressure to the extension brackets 184. As such, when the tiltable conveyor section 28 pivots up or down, the rod of the air cylinder 145 extends and retracts and the amount of air within the cylinder will increase or decrease to maintain pressure within a predetermined range. For example, when the tiltable conveyor section 28 pivots upward, the rod extends downward and more air enters the cylinder casing so as to maintain pressure with the predetermined range. When the tiltable conveyor section 28 pivots downward, the rod retracts upwards and air exits the cylinder casing so as to maintain pressure with the predetermined range. In other embodiments, counter balance mechanism 144 may have different configurations, such as a solid mass selected to counter-balance the weight of the tiltable conveyor section 28.

Figure 7:
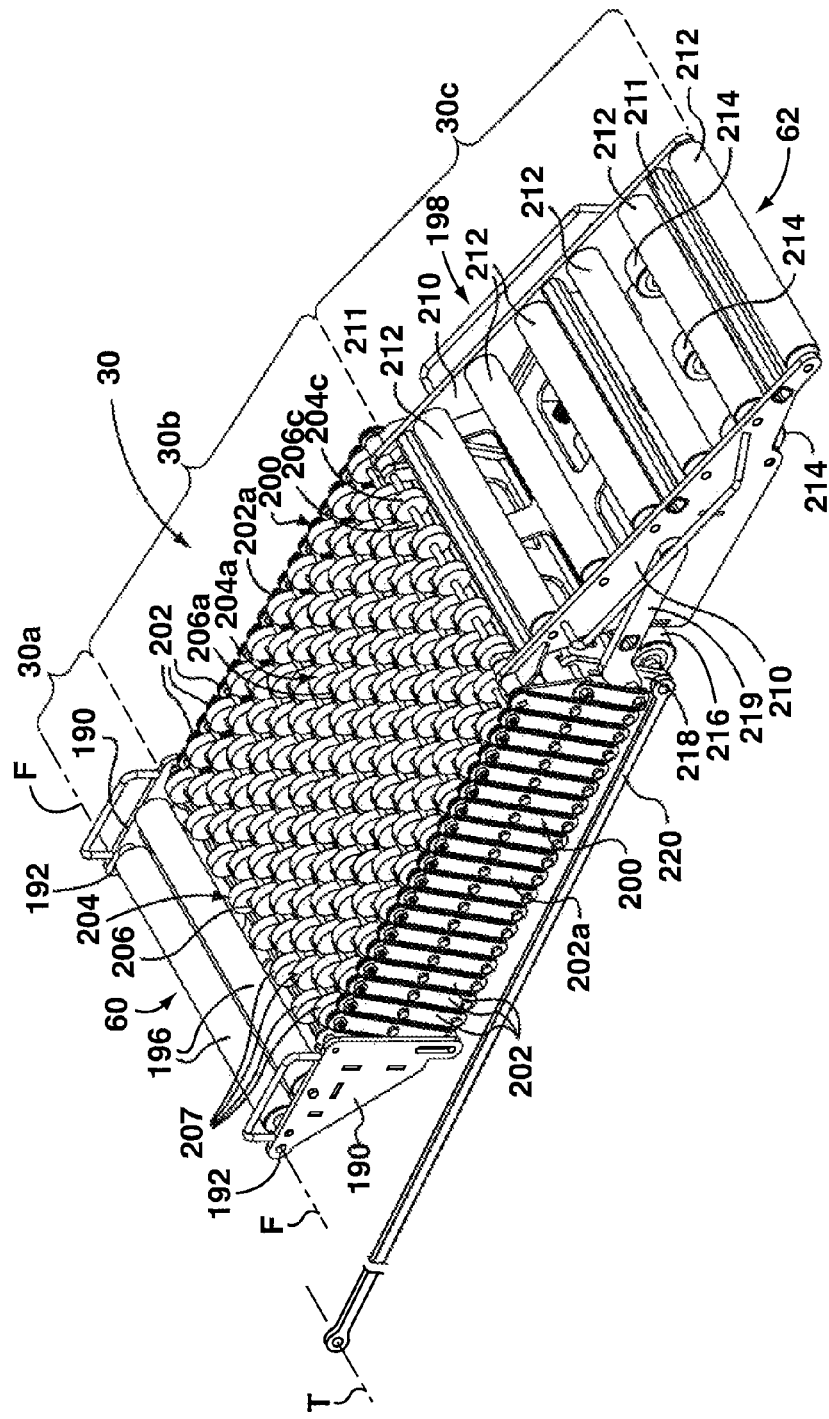
FIG. 7 is a perspective view of the flexible conveyor.

Referring now to FIG. 7, the flexible conveyor 30 includes an entry section 30a, a flexible section 30b, and an exit section 30c. The entry section 30a is located at the first end 60 of the flexible conveyor 30, and the exit section 30c is located at the second end 62. The flexible section 30b is located between the entry section 30a and the exit section 30c.

The entry section 30a includes a pair of triangular brackets 190 for pivotally connecting the flexible conveyor 30 to the slewing conveyor section 26 along the axis F. In particular, the triangular brackets 190 have aligned apertures 192 for receiving corresponding pins or bolts 194 (shown in FIG. 5) that extend laterally outward from the rear bracket 130 of the slewing conveyor section 26. Two spaced apart rollers 196 are also interposed between the triangular brackets 190 and are rotatably coupled thereto for conveying packages along the entry section 30a.

The flexible section 30b includes a pair of side frames 200 spaced apart from each other and coupled to the entry section 30a and to the exit section 30c. Each side frame 200 includes a plurality of pivotally interconnected and criss-crossing links 202 (also shown in FIGS. 8-12). The links 202 can pivot relative to each other, which allows each side frame 200 to expand and contract independently of the other side frame 200.

Rollers 204 are interposed between the side frames 200 and are configured to convey objects from the slewing conveyor section 26 toward the extendable conveyor 16. Each roller 204 includes a shaft 206 rotatably coupled to an opposing pair of links 202 on the side frames 200. For example, the shaft 206a of one roller 204a is coupled to an opposing pair of links 202a of the side frames 200.

In use, when one or both of the side frames 200 expand or retract, the axis of each shaft 206 shifts or tilts corresponding to the expansion or retraction of the side frames 200. More particularly, if both side frames 200 expand, the shafts 206 will shift away from each other so as to lengthen the flexible conveyor 30. If both side frames 200 retract, the shafts 206 will shift closer together so as to shorten the flexible conveyor 30. If only one side frame 200 expands, the shafts 206 will tilt relative to each other so as to curve the flexible conveyor 30. If different portions of each side frame 200 expand and contract independently of each other, the flexible conveyor 30 may curve in two directions so as to form an S-shape (e.g. as shown in FIG. 3).

It will be appreciated that the side frames 200 are also capable of expanding and retracting in a vertical direction so as to incline or decline the flexible conveyor 30, for example, to gravity feed packages along the flexible conveyor 30.

In the illustrated embodiment, the rollers 204 are skate rollers such that each shaft 206 supports a plurality of skate wheels 207. The wheels 207 of each roller 204 are spaced apart along each shaft 206 and are axially offset from the wheels 207 of adjacent rollers 204 so that the wheels 207 of one roller 204 mesh with the wheels 207 of an adjacent roller 204. Meshing the wheels 207 helps maintain a continuous conveying surface, particularly when the flexible conveyor 30 expands or curves, which would otherwise create spaces between the rollers 204.

The exit section 30c includes a declining roller assembly 198, which conveys packages from flexible section 30b to the extendable conveyor 16. The roller assembly 198 includes two spaced apart side plates 210 that are interconnected by cross members 211, and six rollers 212 interposed between the side plates 210 and rotatably coupled thereto. The rollers 212 are arranged in a declining fashion from front to rear such that packages travel to the extendable conveyor 16 under the force of gravity. In some embodiments, one or more of the rollers 212 may be motorized.

Figure 8:
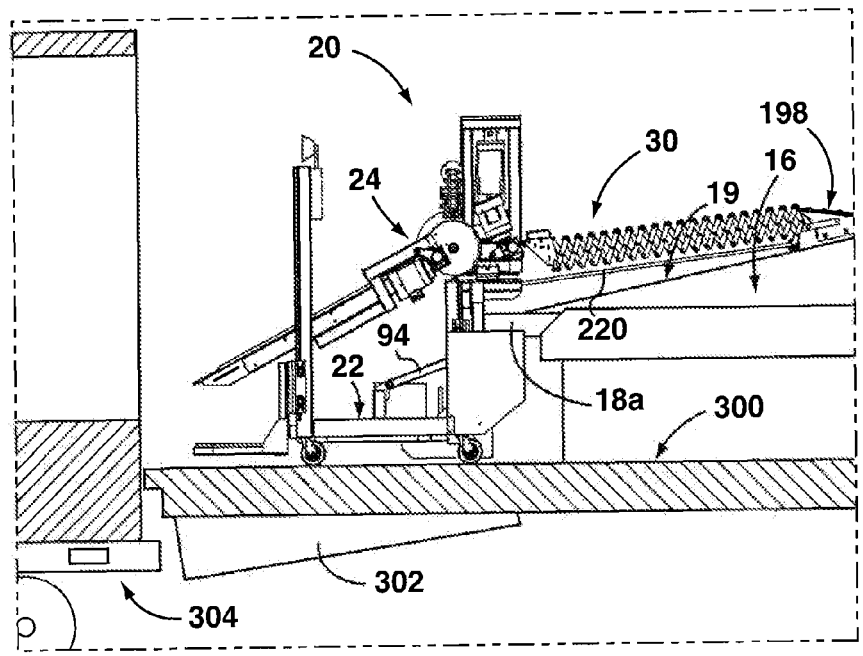
FIG. 8 is a side elevation view of the conveyor apparatus attached to an extendable conveyor and approaching a truck trailer on a loading dock.
Figure 9:
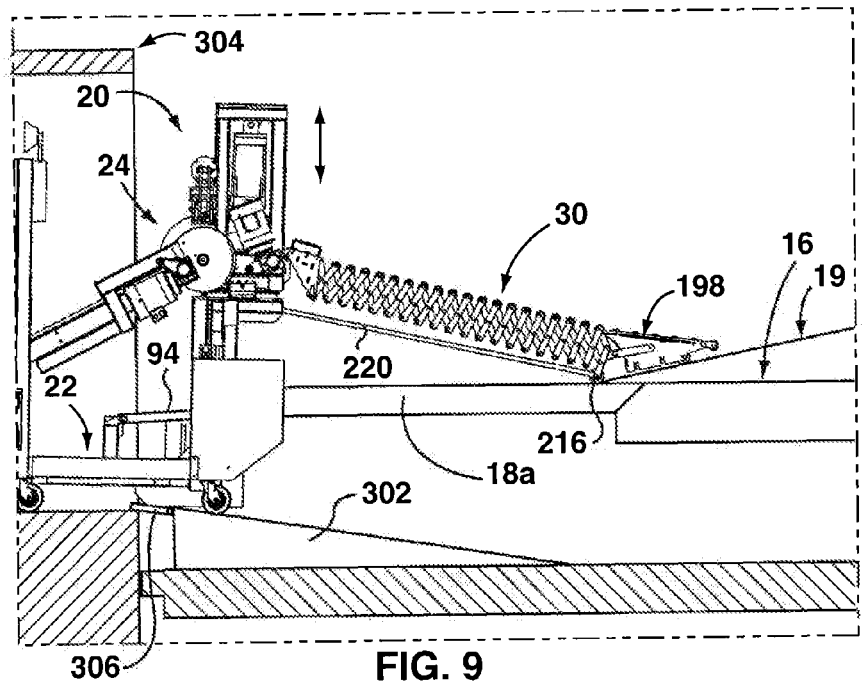
FIG. 9 is a side elevation view of the conveyor apparatus being raised on a dock lever and into the truck trailer.

The side plates 210 of the roller assembly 198 are pivotally coupled to the shaft 206c of the last roller 204c such that the roller assembly 198 can pivot up and down relative to the flexible section 30b, for example, when the angle between the flexible conveyor 30 and the extendable conveyor 16 changes as shown in FIGS. 8 and 9.

The roller assembly 198 includes a first set of three support rollers 214 that support the roller assembly 198 on the extendable conveyor 16. The flexible conveyor 30 also includes a second set of support rollers 216 rotatably coupled to a pair of links 218 of the side frames 200. Each link 218 is pivotally coupled to a corresponding armature 219, which is in turn pivotally coupled to the side plates 210 of the roller assembly 198. Accordingly, the second support rollers 216 shift positions either when the side frames 200 expand or retract, or when the roller assembly 198 pivots up or down about the last shaft 206c.

Two removable anchor bars 220 are also coupled to the flexible conveyor 30. Each anchor bar 220 has one end pivotally coupled to a corresponding link 218, and an opposing end that can be pivotally coupled to the frame 22 along an axis T. In particular, referring to FIG. 4, the opposing end of each anchor bar 220 is pivotally coupled to a corresponding one of two brackets 222 extending rearward from the lift frame 80. As shown in FIGS. 8 and 9, the anchor bars 220 are installed after expanding the side frames 200 and lengthening the flexible conveyor 30. The anchor bars 220 provide a fixed length between the slewing conveyor section 26 and the second end 62 of the flexible conveyor 30.

The anchor bars 220 anchor the roller assembly 198 relative to the frame 22 and maintain lateral alignment of the second end 62 of the flexible conveyor 30 with the extendable conveyor 16. In particular, referring again to FIG. 3, when the slewing conveyor section 26 pivots from side-to-side, the flexible conveyor 30 tends to form an S-shape such that the first end 60 of the flexible conveyor 30 remains aligned with the slewing conveyor section 26, while the second end 62 remains aligned with the extendable conveyor 16. The anchor bars 220 (not shown in FIG. 3) constrain the lateral position of the second end 62 of the flexible conveyor 30 such that the second transverse axis 63 remains generally perpendicular to the second fixed longitudinal axis 56. At the same time, the anchor bars 220 allow the first end 60 of the flexible conveyor 30 to pivot from side-to-side with the slewing conveyor section 26, and the first end 60 is not constrained in a lateral position by the anchor bars 220. As such, the first end 60 of the flexible conveyor 30 can remain aligned with the slewing conveyor section 26 (i.e. such that the first transverse axis 61 remains generally perpendicular to the first pivoting longitudinal axis 54). Without the anchor bars 220, the entire flexible conveyor 30 might tend to pivot with the slewing conveyor section 26 resulting in misalignment between the second end 62 of the flexible conveyor 30 and the extendable conveyor 16.

While the anchor bars 220 constrain the lateral position of the second end 62 and inhibit side-to-side movement of the roller assembly 198, the anchor bars 220 still permit the flexible conveyor 30 to pivot up and down relative to the slewing conveyor section 26, for example, as shown in FIGS. 8 and 9.

The anchor bars 220 may be removed, for example, when the conveyor apparatus 20 is not in use. Removing the anchor bars 220 allows the flexible conveyor 30 to be collapsed into a smaller structure as shown in FIG. 7, for example, to store the flexible conveyor 30.

In some embodiments, the anchor bars 220 may be replaced by, or used in conjunction with, other devices for maintaining the second end 62 of the flexible conveyor 30 in alignment with the extendable conveyor 16. For example, the roller assembly 198 may include a pair of brackets for physically securing the second end 62 of the flexible conveyor 30 to the extendable conveyor 16.

Referring to FIGS. 8-12, operation of the conveyor apparatus 20 will now be described.

As shown in FIG. 8, the conveyor apparatus 20 is positioned on a loading dock 300, and in particular, on a dock leveler 302, in preparation for unloading a truck trailer 304. The first section 18a of the extendable conveyor 16 is coupled to the frame 22 of the conveyor apparatus 20 using the link bar assembly 94. Furthermore, the roller assembly 198 of the flexible conveyor 30 is pivoted upwards while resting on an inclined conveyor 19, which is part of a facility conveyor system. The inclined conveyor 19 generally transports packages from the extendable conveyor 16 to other areas within the facility, which may be a distribution center.

As shown in FIG. 9, the dock leveler 302 has been tilted upward and a lip plate 306 of the dock leveler 302 rests on the floor of the truck trailer 304 as known to a person skilled in the art. The extendable conveyor 16 has been extended forward so as to advance the conveyor apparatus 20 into the truck trailer 304.

While the conveyor apparatus 20 moves upward along the dock leveler 302, the frame 22 pivots upward relative to the extendable conveyor 16, which changes the angular position of the link bar assembly 94. The change in height of the conveyor apparatus 20 also causes the flexible conveyor 30 to pivot downward relative to the frame 22. The anchor bars 220 generally follow the pivoting motion of the flexible conveyor 30. At the same time, the roller assembly 198 pivots upward relative to the rest of the flexible conveyor 30 while remaining on the inclined conveyor 19.

FIG. 9 also shows the roller assembly 198 supported by the second set of support rollers 216 while the roller assembly 198 moves from the inclined conveyor 19 to the extendable conveyor 16. Without the second support rollers 216, the roller assembly 198 might jam into the extendable conveyor 16 during the transition.

The conveyor apparatus 20 allows an operator to unload a first row of stacked packages near the opening of the truck trailer 304. This is typically a design challenge because of various problems including space constraints, the slope of the dock leveler 302, and truck trailers having different elevations. The conveyor apparatus 20 overcomes one or more of these problems by providing an operator platform 74 that positions the operator at a user adjustable height for unloading packages at the entrance of the trailer, a pivoting conveyor 24 with an adjustable height so as to fit within the entrance of the truck trailer 304, and a flexible conveyor 30 that is pivotally coupled to the slewing section 26 to accommodate truck trailers of different elevations and dock levelers of different slopes. The flexible conveyor 30 also includes a roller assembly 198 that pivots up and down relative to the flexible section 30b through the cooperation of the second support rollers 216, links 218, and armatures 219 (all shown in FIG. 7). Pivotally coupling the roller assembly 198 to the flexible section 30b allows the roller assembly 198 to remain flat on the extendable conveyor 16 while the pivoting conveyor 24 moves up and down, and/or while the flexible conveyor 30 pivots up and down relative to the slewing section 26.

Figure 10:
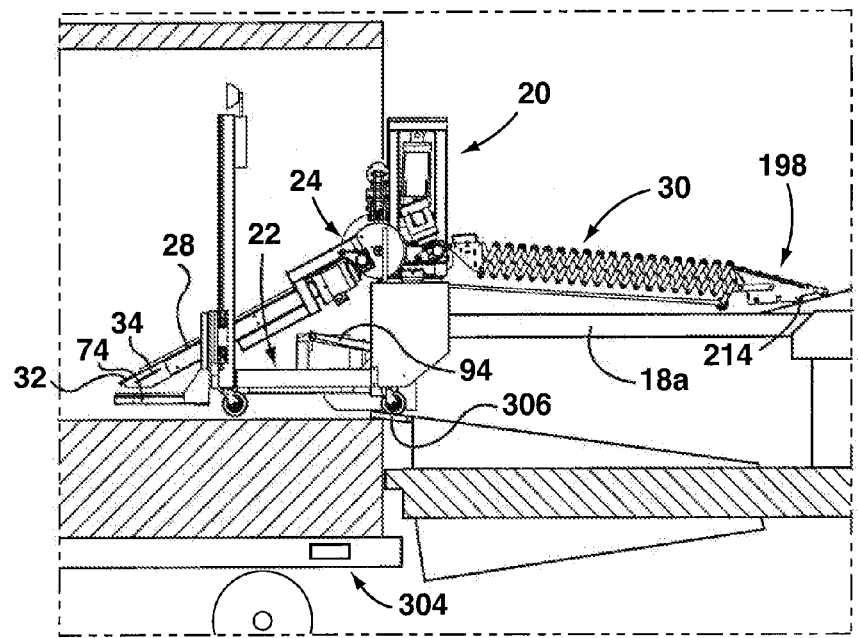
FIG. 10 is a side elevation view of the conveyor apparatus being advanced into the truck trailer by extension of the extendable conveyor.

As shown in FIG. 10, the conveyor apparatus 20 is now entering the truck trailer 304 and is level on the floor of the truck trailer 304. As a result, the frame 22 has risen relative to the extendable conveyor 16 thereby pivoting the link bar assembly 94 downward relative to the frame 22.

The pivoting conveyor 24 has also been lowered relative to the frame 22 using the conveyor lifting mechanism 85. It is generally advisable to lower the pivoting conveyor 24 while entering the truck trailer 304 in order to provide more clearance between the top of the slewing conveyor section 26 and the ceiling of the truck trailer 304.

The pivoting conveyor 24 has also been lowered such that the free end 32 of the tiltable conveyor section 28 is adjacent to the operator platform 74. In this position, an operator can stand on the operator platform 74 while moving packages from the truck trailer floor and onto the free end 32 of the tiltable conveyor section 28. The operator can also swing the free end 32 from side-to-side (e.g. as shown in FIG. 3) about the vertical axis V, or up and down about the horizontal axis H, by grasping one of the handles 34 and depressing the brake release button 106 so as to release the brake calipers 102 and 142. Once in a desired position, the operator lets go of the brake release button 106 and the brake calipers 102 and 142 lock the slewing conveyor section 26 and the tiltable conveyor section 28 in place and inhibit further movement. Moving and locking the free end 32 in different positions allows the operator to unload packages located in various lateral and vertical positions within the truck trailer 304.

In other embodiments, the brake release button 106 may be replaced by another brake release control, such as a laser sensor, pressure sensor, proximity sensor, and the like. In such embodiments, the operator releases the brake calipers 102 and 142 by activating the brake release control, for example, by placing their hand on one of the handles 34.

In FIG. 10, it can also be seen that the roller assembly 198 is supported by the first support rollers 214 now instead of the second support rollers 216 as in FIG. 9. Without the first support rollers 214, the roller assembly 198 might drag on the inclined conveyor 19.

Figure 11:
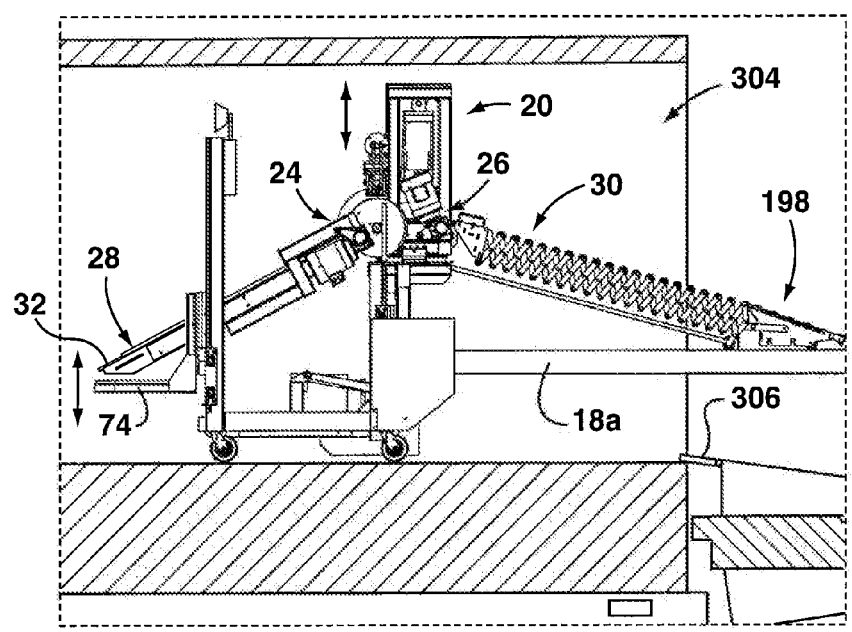
FIG. 11 is a side elevation view of the conveyor apparatus with the pivoting conveyor being raised relative to the frame, and an operator platform being raised relative to the frame.

As shown in FIG. 11, the operator platform 74 has risen by actuating the platform elevation mechanism 75. Raising the operator platform 74 may help position the operator at a more ergonomic height for unloading packages, such as packages stacked at a height midway within the truck trailer 304, or higher. Raising the operator platform 74 may help reduce physical strains that the operator might otherwise experience while reaching for packages near the ceiling of the truck trailer.

The pivoting conveyor 24 has also been raised using the conveyor lifting mechanism 85. Raising the pivoting conveyor 24 may help provide a steeper downward slope for gravity feeding packages from the slewing conveyor section 26 to the extendable conveyor 16. It will be appreciated that the pivoting conveyor 24 is near the maximum height in this position while still maintaining an appropriate clearance between the slewing conveyor section 26 and the ceiling of the truck trailer 304.

Figure 12:
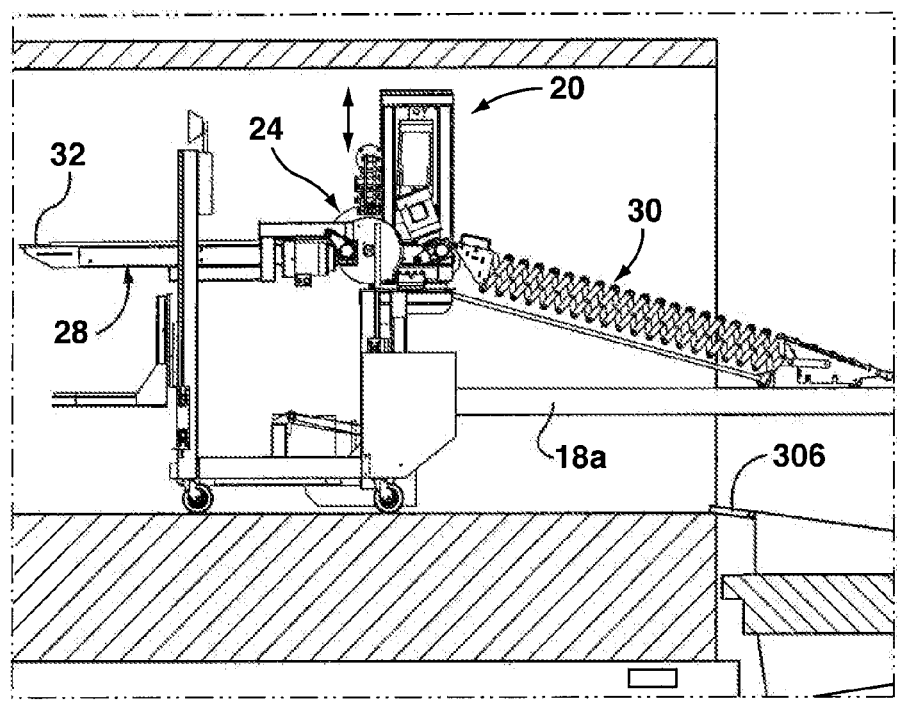
FIG. 12 is a side elevation view of the conveyor apparatus, in which the tiltable conveyor section of the pivoting conveyor has been pivoted upward.

As shown in FIG. 12, the tiltable conveyor section 28 has been pivoted upward about the horizontal axis H, which may help the operator ergonomically unload packages stacked midway or higher within the truck trailer 304.

While pivoting the tiltable conveyor section 28 up or down, the counter balance mechanism 144 applies a force that makes the tiltable conveyor section 28 feel near weightless to provide a "floating operation". More particularly, the counter balance mechanism 144 applies a moment of force about the horizontal axis H, which counteracts a corresponding opposite moment of force caused by the weight of the tiltable conveyor section 28. If the counter balance mechanism 144 is configured such that the two moments of force are approximately equal, the operator can move the tiltable conveyor section 28 up or down by pulling on the handles 34 with a relatively small amount of force.

Once the free end 32 has been moved to a desired location, for example by pivoting the tiltable conveyor section 28 up and down, and/or by pivoting the slewing conveyor section 26 from side to side, the operator may begin unloading one or more packages from the shipping container and onto the conveyor apparatus 20. In particular, the operator picks up, or slides, a package from the truck trailer 304 and onto the free end 32. The conveying surface 40 then conveys the package along the tiltable conveyor section 28 and to the slewing conveyor section 26, where the package transitions onto the conveying surface 42. The conveying surface 42 carries the package horizontally along the slewing conveyor section 26 and to the first end 60 of the flexible conveyor 30. If the slewing conveyor section 26 has been pivoted to one side, the package will gradually curve along a continuous path and down the S-shaped flexible conveyor 30 under the force of gravity. Otherwise, if the slewing conveyor section 26 has not been pivoted, the package will travel straight down the flexible conveyor 30. In both cases, the package exits the conveyor apparatus 20 onto the extendable conveyor 16.

The process of successively advancing the conveyor apparatus 20 into the truck trailer 304, adjusting the height of the operator platform 74 and/or the slewing conveyor section 26, moving the free end 32 up and down or side-to-side, and unloading packages from the truck trailer 304, continues until all packages have been unloaded. After unloading the truck trailer 304, the conveyor apparatus 20 may be removed from the truck trailer 304 by retracting the extendable conveyor 16.

While the conveyor apparatus 20 herein has been described with respect to unloading packages from truck trailers, the conveyor apparatus 20 may also be used to unload other objects from other shipping containers, such as packages within intermodal containers transported by cargo ships, railcars, and transport trucks. Furthermore, the conveyor apparatus 20 may be used to unload mailbags from mail trucks and other bagged products from shipping containers. The conveyor apparatus 20 may also be used to load and unload packages at other locations other than shipping containers, for example, on the floor of a warehouse or distribution center.

The conveyor apparatus 20 can also be moved between two or more loading bays so as to unload truck trailers at different loading bays. For example, the extendable conveyor 16 might be mounted on transversely extending rails within the floor of the distribution center, thereby allowing the extendable conveyor 16 to move laterally along the rails from one loading bay to another. The conveyor apparatus 20 generally moves laterally with the extendable conveyor 16 to each loading bay. In particular, the caster wheels 72 can swivel to a lateral orientation while the conveyor apparatus 20 moves laterally with the extendable conveyor 16 to each loading bay. Once at a specific loading bay, the caster wheels 72 can swivel back to a longitudinal orientation and the extendable conveyor 16 can extend and push the conveyor apparatus 20 into the truck trailer as described previously. Generally, the link bar assembly 94 couples the frame 22 to the extendable conveyor 16 with sufficient strength and stability so as to allow the conveyor apparatus 20 to travel laterally with the extendable conveyor 16.

Furthermore, the conveyor apparatus 20 may also be used to load packages into a truck trailer or another shipping container. In this case, the flexible conveyor 30 may be powered, and the conveying surfaces 40 and 42 may be operated in reverse, so as to convey packages from the extendable conveyor 16 toward the free end 32 where an operator loads the packages into the truck trailer.

Figure 13:
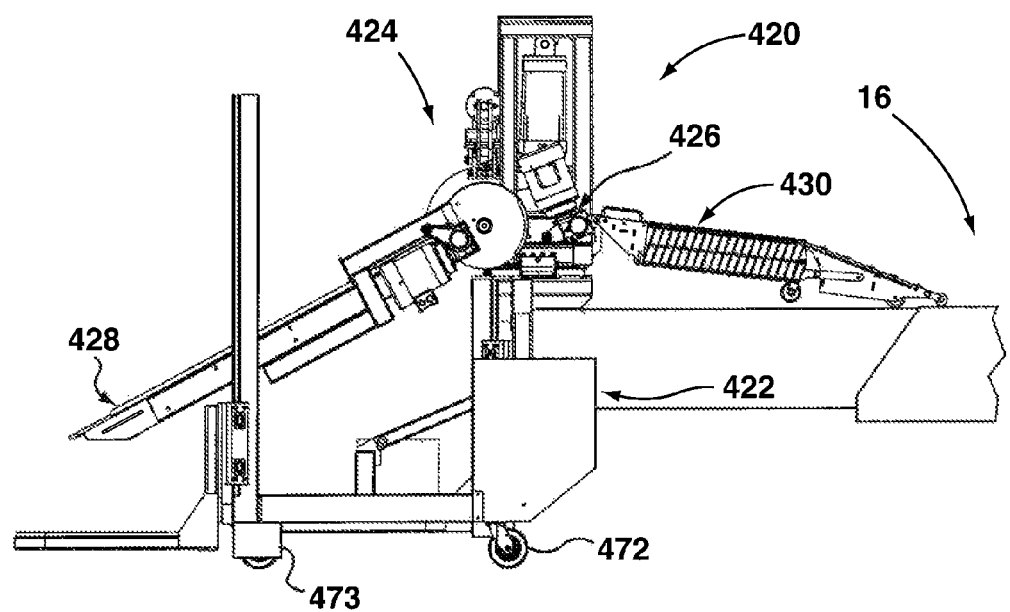
FIG. 13 is a side elevation view of a conveyor apparatus according to another embodiment of the present invention.

Referring now to FIG. 13, illustrated therein is a conveyor apparatus 420 made in accordance with an embodiment of the present invention. The conveyor apparatus 420 is similar in many respects to the conveyor apparatus 20 and similar elements are given similar reference numerals incremented by four hundred. In particular, the conveyor apparatus includes a frame 422 connectable to the extendable conveyor 16, a pivoting conveyor 424 pivotally coupled to the frame 422 for unloading packages from a shipping container, and a flexible conveyor 430 extending from the pivoting conveyor 424 toward the extendable conveyor 16 for conveying packages from the pivoting conveyor 424 to the extendable conveyor 16. Furthermore, the pivoting conveyor 424 includes two conveyor sections, namely, a generally horizontal slewing conveyor section 426 pivotally coupled to the frame 422 for pivotal movement about a vertical axis, and a tiltable conveyor section 428 having a proximal end pivotally coupled to the slewing conveyor section 26 for pivotal movement about a horizontal axis.

One difference is that the frame 422 includes a base supported by two motorized wheels 473 for driving the frame 422. As such, the conveyor apparatus 20 can move in and out of the shipping container under its own power. In contrast, the conveyor apparatus 20 described previously generally relies on the extendable conveyor 16 to push it in and out of the shipping container.

In the illustrated embodiment, two motorized wheels 473 are located at the front of the frame 422 and two caster wheels 472 are located at the rear of the frame 422. As such, the conveyor apparatus 20 operates as a front wheel drive vehicle with skid steering capabilities. For example, when turning the conveyor apparatus 20, one motorized wheel 473 rotates faster than the other motorized wheel 473, and the caster wheels 472 swivel freely in response to movement of the conveyor apparatus 20. The motorized wheels 473 may also be rotated in opposite directions to provide a tighter turning radius.

In other embodiments, the wheels 472 and 473 may have other configurations and the conveyor apparatus 20 may be driven in other modes. For example, two caster wheels 472 may be located at the front of the frame 422 and two motorized wheels 473 may be located at the rear of the frame 422 so as to provide rear wheel drive. Furthermore, all of the wheels may be motorized wheels 473.

The motorized wheels 473 are generally powered by electrical motors (not shown). In other embodiments, the motorized wheels 473 may be powered by any other suitable power source such as pneumatics, hydraulics and the like.

Figure 14:
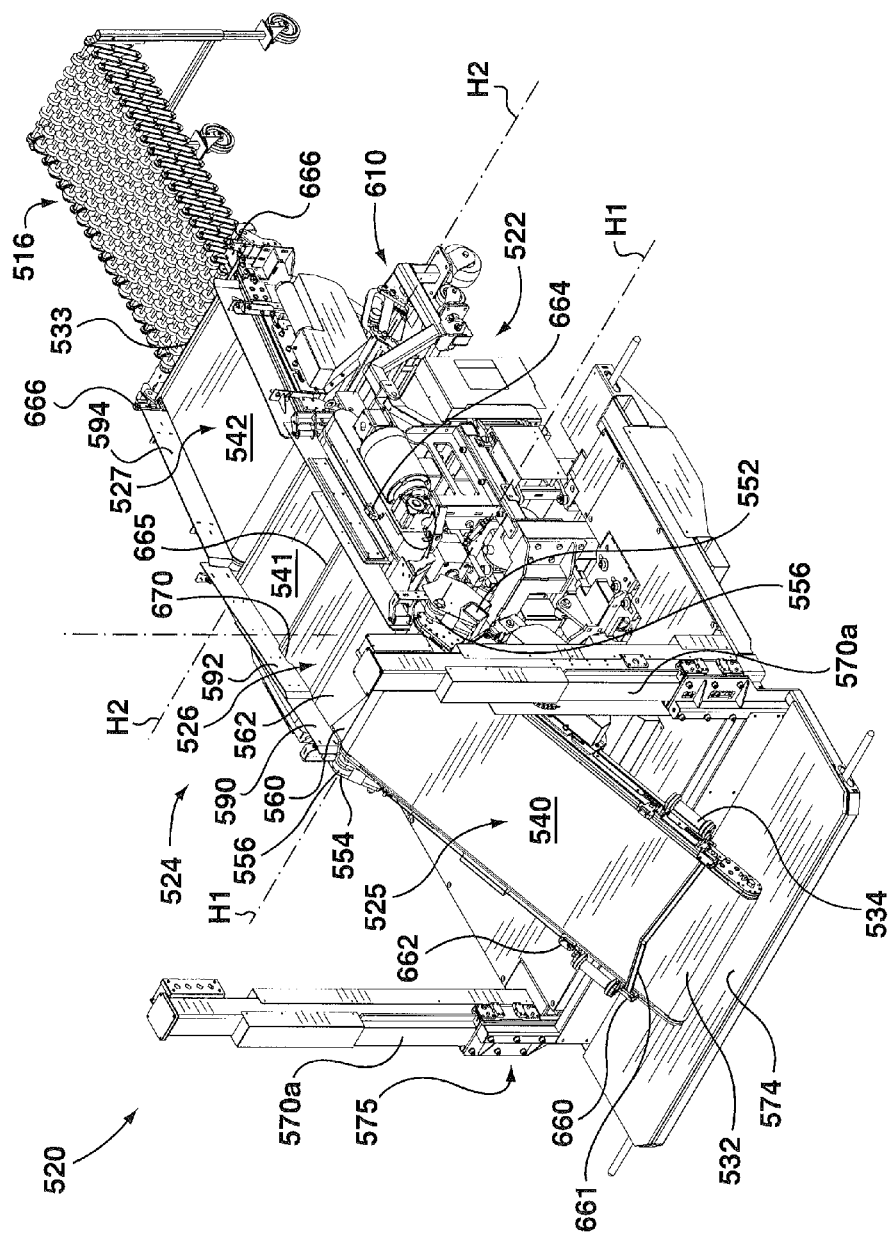
FIG. 14 is a perspective view of a conveyor apparatus according to another embodiment of the present invention.

Referring now to FIGS. 14-20, illustrated therein is a conveyor apparatus 520 made in accordance with another embodiment of the present invention. In FIG. 14, the conveyor apparatus 520 is configured to load packages into a shipping container. However, the conveyor apparatus 520 can also be configured to unload packages from the shipping container as will be described with respect to FIG. 20.

Figure 15:
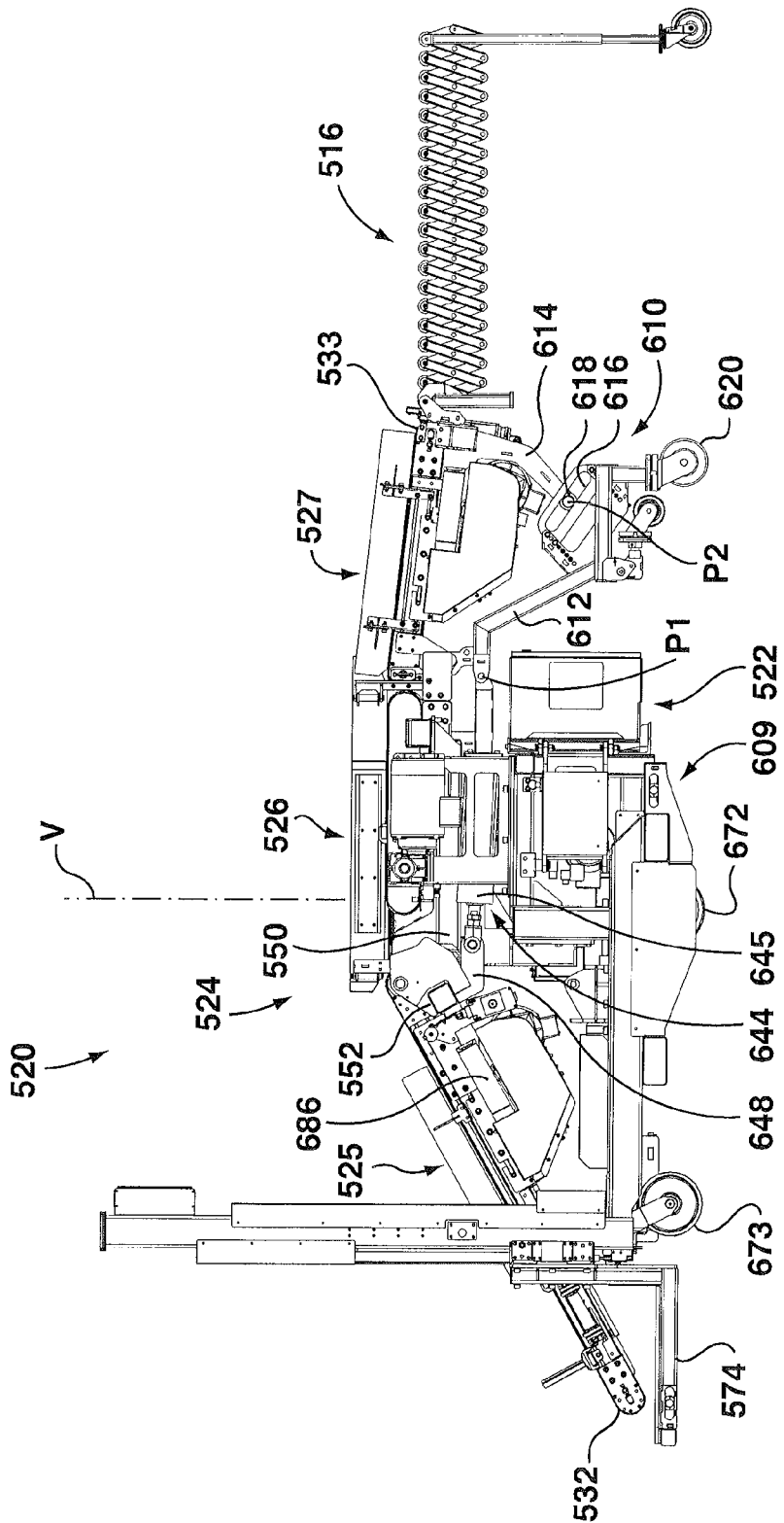
FIG. 15 is a side elevation view of the conveyor apparatus of FIG. 14.

The conveyor apparatus 520 is similar in some respects to the conveyor apparatus 20 and similar elements are given similar reference numerals incremented by five hundred. For example, the conveyor apparatus includes a frame 522 connectable to an extendable conveyor 516. As shown in FIGS. 14 and 15, the extendable conveyor 516 may be a powered flexible conveyor, which may include powered skate wheels or powered rollers. Alternatively, the frame 522 could be connected to another type of extendable conveyor such as a telescoping extendable conveyor, which may be similar to the extendable conveyor 16 described previously.

With reference to FIG. 14, the conveyor apparatus 520 includes a pivoting conveyor 524. More specifically, as shown in the illustrated embodiment, the pivoting conveyor 524 includes three conveyor sections, namely, a first pivotable conveyor section 525, a second non-pivotable conveyor section 526, and a third tiltable conveyor section 527. Each conveyor section 525, 526, 527 includes a respective conveying surface 540, 541, 542 for conveying objects thereon. As shown, the conveying surfaces 540, 541, 542 may be conveyor belts, which may be powered by motors.

Similar to the apparatus 20 described above, the pivoting conveyor 524 is pivotally coupled to the frame 522 for pivotal movement about a vertical axis V and for pivotal movement about a first horizontal axis H1. However, one difference is that the first pivotable conveyor section 525 is pivotally coupled to the frame 522 for pivotal movement about both the vertical axis V and the first horizontal axis H1, as opposed to having a slewing conveyor section and a separate tiltable conveyor section.

The first pivotable conveyor section 525 conveys objects between a free end 532 and the second non-pivotable conveyor section 526. The free end 532 is generally configured to support objects being loaded or unloaded from a shipping container. Furthermore, the free end 532 can be moved up and down, and side-to-side by pivoting the first pivotable conveyor section 525 about the first horizontal axis H2 and the vertical axis V.

The second non-pivotable conveyor section 526 conveys objects between the first pivotable conveyor section 525 and the third tiltable conveyor section 527. The second non-pivotable conveyor section 526 maintains a generally horizontal orientation (e.g. such that the second conveying surface 541 remains in a generally horizontal plane).

The third tiltable conveyor section 527 conveys objects between the second non-pivotable conveyor section 526 and the extendable conveyor 516. The third tiltable conveyor section 527 includes a rear end 533 pivotally coupled to the extendable conveyor 516. Furthermore, the third tiltable conveyor section 527 is pivotally coupled to the frame 522 for pivotal movement about a second horizontal axis H2. Pivoting the third tiltable conveyor section 527 about the second horizontal axis H2 allows the rear end 533 to be moved up and down, for example, to remain at the same general height as the extendable conveyor 516.

Figure 16:
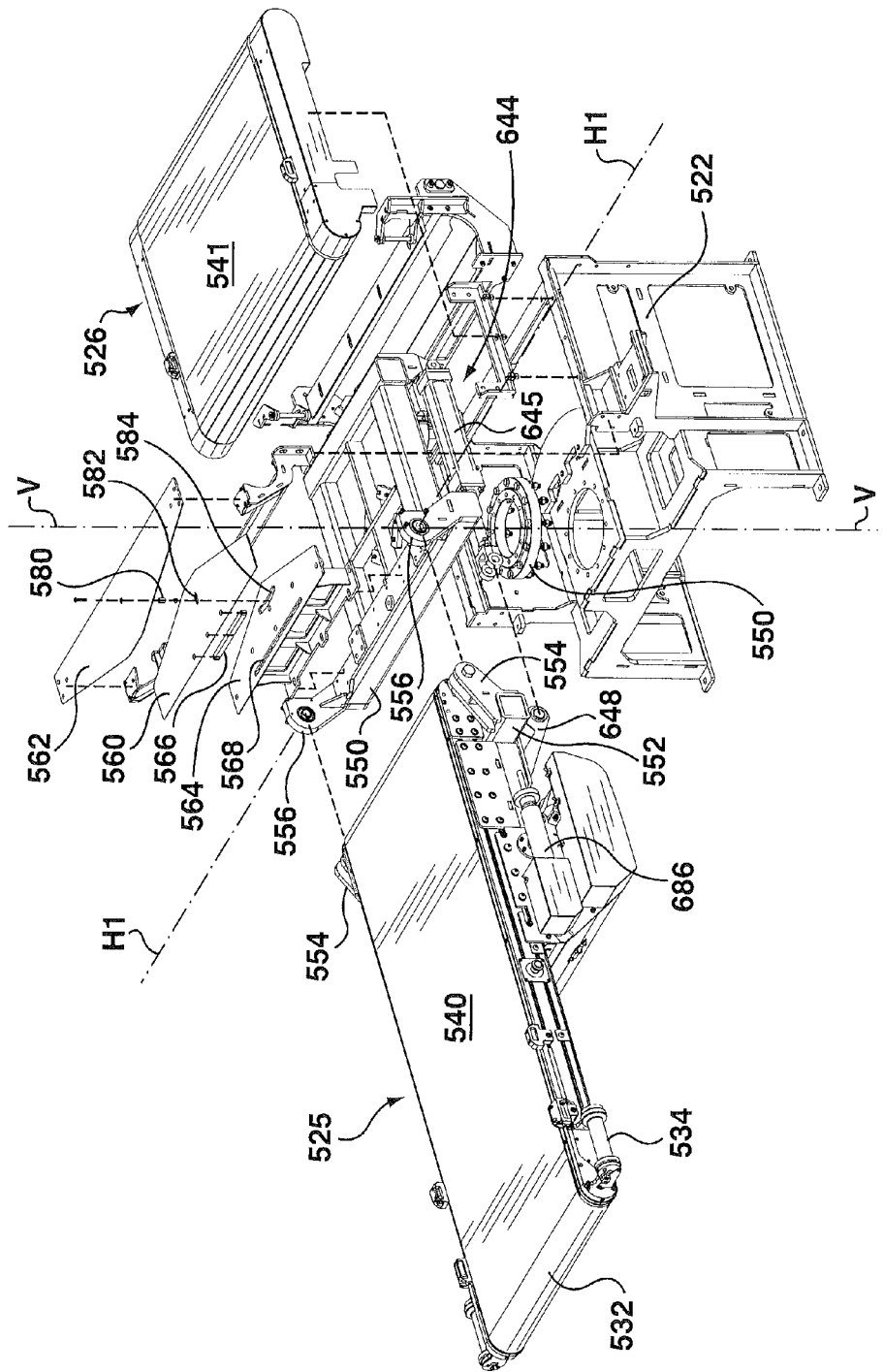
FIG. 16 is an exploded perspective view of a pivoting conveyor of the conveyor apparatus of FIG. 14.

Referring now to FIG. 16, the apparatus 520 may include a support arm 550 for pivotally coupling the first pivotable conveyor section 525 to the frame 522 about the vertical axis V. In some examples, the support arm 550 may be pivotally coupled to the frame 522 so that the vertical axis V is located near the transition between the first and the second conveyor sections 525, 526. For example, as shown in FIGS. 15 and 16, the support arm 550 extends longitudinally from the first pivotable conveyor section 525 towards the second non-pivotable conveyor section 526 underneath the first and second conveying surfaces 540, 542. The support arm 550 is pivotally coupled to the frame 522 about the vertical axis V at a location underneath the transition between the first and second conveying surfaces 540, 542. In some examples, the support arm 550 may be pivotally coupled to the frame 522 using a slewing bearing 582, which may be similar to the slewing bearing 82 described previously.

With reference to FIG. 16, the first pivotable conveyor section 525 is also pivotally coupled to the support arm 550 about the first horizontal axis H1. For example, the first pivotable conveyor section 525 may include a cross-member 552 having two opposing mounting brackets 554 for pivotally coupling the first pivotable conveyor section 525 to two opposing upright posts 556 on the support arm 550.

Pivotal movement of the first pivotable conveyor section 525 about the vertical axis V and horizontal axis H may be controlled in a similar way as the apparatus 20. For example, with reference to FIGS. 15 and 16, the apparatus 520 may include a counter balance mechanism 644, which may be similar to the counter balance mechanism 144. As shown in FIG. 15, the counter balance mechanism 644 may be mounted underneath the second non-pivotable conveyor section 526, and may include an air cylinder 645 pivotally coupled to the first pivotable conveyor section 525 through a link arm 648 that is rigidly attached to the cross-member 552. In use, the air cylinder 645 applies a force to the link arm 648, which can be selected to counteract the weight of the first pivotable conveyor section 525 about the first horizontal axis H1. This may allow the first pivotable conveyor section 525 to feel almost weightless when being pivoted up and down. For example, an operator can apply a small force at handles 534 in order to pivot the first pivotable conveyor section 525 up or down.

The apparatus 520 may also include one or more brake assemblies for inhibiting movement of the first pivotable conveyor section 525 about the vertical axis V and/or the first horizontal axis H1. The brake assemblies may be similar to the ones described above and may include brake discs and calipers, which may be activated and deactivated by a brake release button or sensor on the handles 534.

The apparatus 520 includes one or more transition plates located between the first and second conveying surfaces 540, 541 for transferring objects therebetween. For example, as shown in FIG. 16, there is a first transition plate 560 and a second transition plate 562. The first transition plate 560 is located adjacent to the first pivotable conveyor section 525, and the second transition plate 562 is located adjacent to the second non-pivotable conveyor section 526.

One of the transition plates 560, 562 overlaps the other. For example, in the illustrated embodiment, the second transition plate 562 overlaps the first transition plate 560. This may reduce the likelihood of objects jamming on the transition plates 560, 562 when loading objects into a shipping container. In other embodiments, the overlap of the transition plates 560, 562 may be reversed, for example, when unloading objects from a shipping container.

In some examples one or more of the transition plates 560, 562 may be configured to move. For example, with reference to FIGS. 17A-17C, the first transition plate 560 is configured to move laterally from side-to-side relative to the first conveying surface 540 and may be referred to as a "shuttling transition plate". In contrast, the second transition plate 562 may remain stationary and may be referred to as a "fixed transition plate".

Figure 17A:
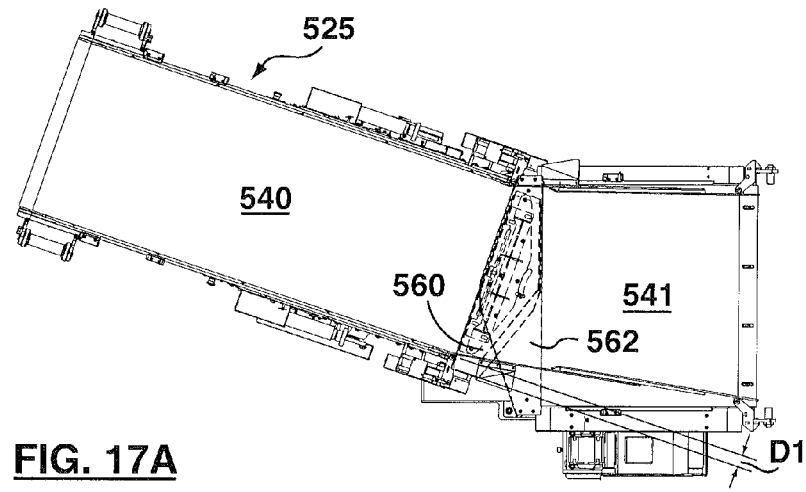
FIGS. 17A, 17B, and 17C are top plan views of the conveyor apparatus of FIG. 14, in which the pivoting conveyor has been pivoted from side-to-side in three different positions.
Figure 17B:
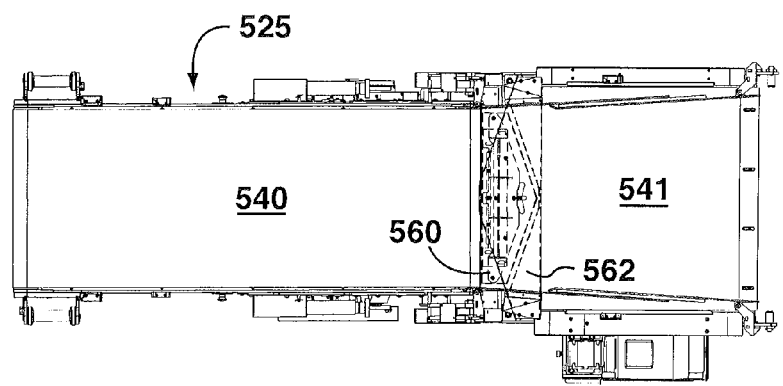
Figure 17C:
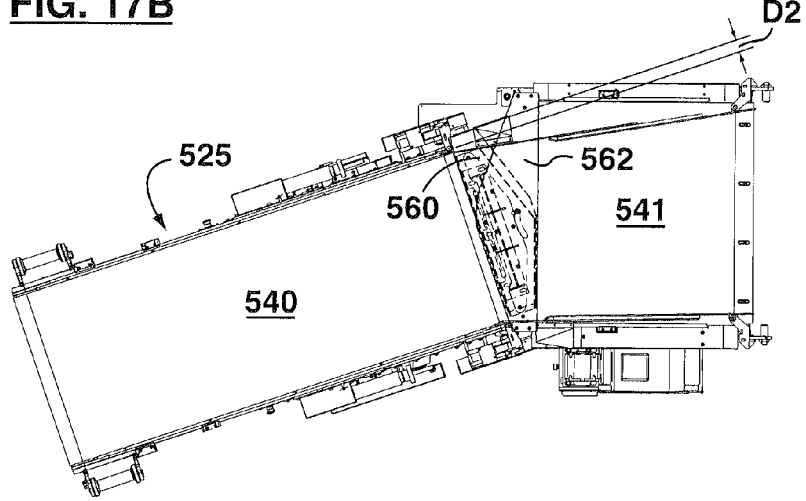

Movement of the shuttling transition plate 560 generally occurs in response to pivoting the first pivotable conveyor section 525 from side-to-side about the vertical axis V. For example, with reference to FIG. 17A, when the first pivotable conveyor section 525 pivots clockwise, the shuttling transition plate 560 may move to the right by a distance D1 (as viewed from the free end 532 in FIG. 17A). Similarly, as shown in FIG. 17C, when the first pivotable conveyor section 525 pivots counter-clockwise, the shuttling transition plate 560 may move to the left by a distance D2 (as viewed from the free end 532 in FIG. 17C).

In some embodiments, the distances D1 and D2 may depend upon the angular rotation of the first pivotable conveyor section 525 about the vertical axis V. For example, the distances D1 and D2 may be about 4-centimeters when the first pivotable conveyor section 525 is pivoted about the vertical axis by about 20-degrees. In other examples, the distances D1 and D2 could be larger or smaller.

Referring now to FIG. 16, movement of the shuttling transition plate 560 may be controlled automatically using a shuttling mechanism. For example, in the illustrated embodiment, the shuttling transition plate 560 is slidably mounted on a support plate 564, which is fastened to the top of the support arm 550. In particular, a guide bar 566 is fastened to the bottom of the shuttling transition plate 560 and extends downward through a lateral guide slot 568 in the support plate 564. This allows the shuttling transition plate 560 to move from side-to-side relative to the support plate 564 and the rest of the first pivotable conveyor section 525. Motion along the guide slot 568 is controlled using a pin 580 fastened to the bottom of the fixed transition plate 562. The pin 580 extends downward through a longitudinal slot 582 in the shuttling transition plate 560, and through a curved slot 584 in the support plate 564. In operation, when the first pivotable conveyor section 525 pivots from side-to-side, the pin 580 moves within the curved slot 584 while also pressing again the edges of the longitudinal slot 582 on the shuttling transition plate 660. This causes the shuttling transition plate 560 to move sideways along the lateral guide slot 568. In other examples, movement of the shuttling transition plate 560 may be controlled in other ways, for example, using motors or other actuators.

In general, movement of the shuttling transition plate 560 can help reduce gaps between the conveying surfaces 540, 541 that might otherwise cause objects to jam.

The conveyor apparatus 520 may also have other features that facilitate transfer of objects between the conveying surfaces 540, 541, 542. For example, the second conveying surface 541 may have a lower coefficient of friction than the first conveying surface 540. More particularly, the first and third conveying surfaces 540, 542 may be made from Ethylene Propylene Diene Monomer Rubber (EDPM Rubber) and the second conveying surface 541 may be made from Acetal (also known as polyoxymethylene). The low friction of the second conveying surface 541 may allow objects to slip and change directions more easily while transitioning between the first and second conveying surfaces 540, 541. This can help reduce the likelihood of objects jamming through the transition.

Referring again to FIG. 14, the apparatus 520 may include one or more side guides extending along the sides of the conveying surfaces 540, 541, 542 for guiding the objects thereon. For example, as shown, there may be first and second pivoting side guides 590, 592 positioned on each side of the second conveying surface 541. The first and second pivoting side guide 590, 592 may be telescopically mounted to each other. Furthermore, the first pivoting side guide 590 may be pivotally coupled to the first pivotable conveyor section 525, and the second pivoting side guide 592 may be pivotally coupled to the second non-pivotable conveyor section 526. Thus, when the first pivotable conveyor section 525 pivots from side-to-side about the vertical axis V, the first and second pivoting side guides 590, 592 also pivot and telescope with respect to each other, which can help guide objects through the transition between the first and second conveying surfaces 540, 541.

The apparatus 520 may also include one or more fixed side guides. For example, fixed side guides 594 may be rigidly mounted to the third tiltable conveyor section 527 along the third conveying surface 542.

Figure 18:
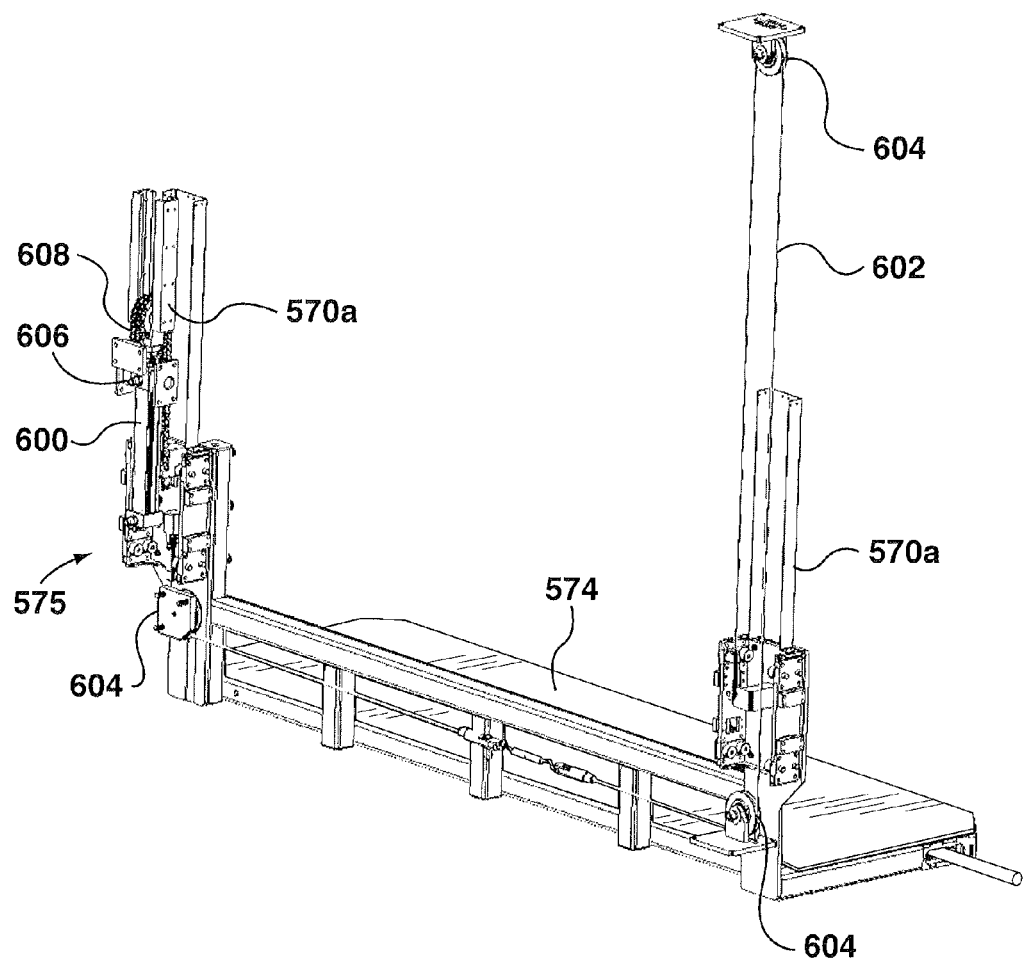
FIG. 18 is a perspective view of an operator platform and platform elevation mechanism of the conveyor apparatus of FIG. 14.

In the illustrated embodiment, the apparatus 520 includes an operator platform 574, which may be similar to the operator platform 74 described above. The apparatus 520 may also include a platform elevation mechanism 575 for raising and lowering the operator platform 574 along posts 570a that extend upward from the frame 522. As shown in FIG. 18, the platform elevation mechanism 575 may include an elevation actuator, such as a hydraulic cylinder 600 located within one of the posts 570a. The hydraulic cylinder 600 raises and lowers the operator platform 574 using a system of cables 602 and pulleys 604 located within the posts 570a.

The platform elevation mechanism 575 may also include a safety lock mechanism for securing the operator platform 74 at a specific height. As shown, the safety lock mechanism may include an operating valve and a down flow restrictor 606 on the hydraulic cylinder 600 for preventing sudden movements of the operator platform 574. The safety lock mechanism may also include a load chain 608 for backing up the cable 602 in the event of failure of the cables 602.

Referring again to FIG. 15, the frame 522 may include a first frame section 609 for supporting the first and second conveyor sections 525, 526, and a second frame section 610 for supporting the third tiltable conveyor section 527.

The second frame section 610 generally supports the third tiltable conveyor section 527 while still allowing the third tiltable conveyor section 527 to pivot up and down about the second horizontal axis H2. For example, the second frame section 610 may be pivotally coupled to the first frame section 609 by a first link arm 612, and pivotally coupled to the third tiltable conveyor section 527 by a second link arm 614. The first link arm 612 may be rigidly attached to the second frame section 610 and may be pivotally coupled to the frame 522 at a pivot point P1. The second link arm 614 may be rigidly attached to the third tiltable conveyor section 527 and may be pivotally coupled to the second frame section 610 at a pivot point P2.

As shown, the second pivot point P2 may be a rolling-sliding connection. For example, the second frame section 610 may have a guide slot 616 that slidably and rotatably receives a pin 618 on the second link arm 614. Furthermore, the guide slot 616 may be oriented generally perpendicular to the second link arm 614. This allows the second frame section 610 to support the third tiltable conveyor section 527 through the second link arm 614 while still allowing the third tiltable conveyor section 527 to pivot up and down about the second horizontal axis H2. This can be useful when the extendable conveyor 516 is a powered flex conveyor (as shown in FIGS. 14 and 15), which might not be capable of supporting the third tiltable conveyor section 527 on its own.

As shown, the second frame section 610 may include one or more wheels 620 for engaging the ground and supporting the second frame section 610. The first frame section 609 can also be supported by wheels 672, 673. Furthermore, some of the wheels may be motorized wheels for driving the frame 522. For example, the rear wheels 672 of the first frame section 609 may be motorized, while the front wheels 673 may be caster wheels. Accordingly, the conveyor apparatus 520 operates as a rear wheel drive vehicle with skid steering capabilities. For example, when turning the conveyor apparatus 520, one motorized wheel 672 rotates faster than the other motorized wheel 672, and the caster wheels 673 swivel freely in response to movement of the conveyor apparatus 520. The motorized wheels 672 may also be rotated in opposite directions to provide a tighter turning radius.

In other embodiments, the wheels 672, 673 may have other configurations and the conveyor apparatus 520 may be driven in other modes such as front wheel drive, four-wheel drive, and the like. The apparatus 520 could also include other types of steering mechanisms.

In some embodiments, the apparatus 520 may include an on-board battery for powering the motorized wheels 672. This allows the apparatus to be self-propelled, which can be particularly beneficial when the extendable conveyor 516 is a flexible conveyor that is not capable of being extended or retracted on its own. The apparatus 520 could also be connected to an external power source (e.g. using an electrical cable).

Figure 19:
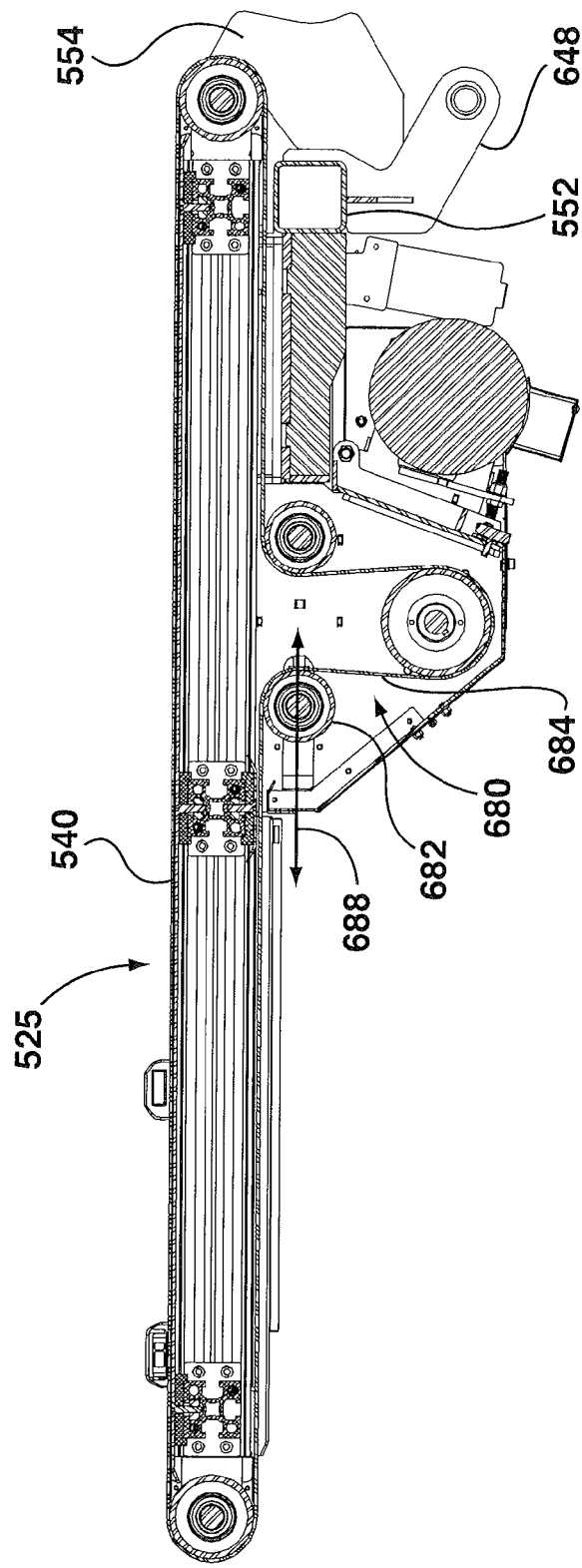
FIG. 19 is a cross-sectional view of a first pivotable conveyor section of the conveyor apparatus of FIG. 14.

Referring now to FIG. 19, the apparatus 520 may include one or more belt tensioners for maintaining tension along the conveyor belts. For example, as shown in FIG. 19, there is a belt tensioner 680 underneath the first conveying surface 540. The belt tensioner 680 includes a tension roller 682 for pressing against a conveyor belt 684. An actuator 686 (shown in FIG. 16) is coupled to the tension roller 682 for moving the tension roller 682 along a path 688 towards or away from the belt 684 or to increase or decrease pressure applied to the belt 684, and thus, increase or decrease tension. The actuator 686 can be controlled by a source of fluid pressure such as pneumatic or hydraulic pressure source, or another biasing element such as a compression spring. This can help maintain a desired tension on the conveyor belt 684, which may reduce bearing loading and/or belt stretching.

Referring again to FIG. 14, the apparatus 520 may include one or more sensors 660, 662, 664, 666 for detecting objects along the conveying surfaces 540, 541, 542. The sensors 660, 662, 664, 666 may be optical sensors, proximity sensors, and the like.

In some examples, the sensors 660, 662, 664, 666 can be used to control speed of the conveying surfaces 540, 541, 542. This may allow objects to be cued on the conveying surfaces 540, 541, 542, for example, when loading objects into a shipping container.

For example, the first and second sensors 660, 662 may detect objects travelling along the first conveying surface 540. More particularly, the first sensor 660 may detect objects approaching the free end 532 and may stop the first conveying surface 540 before the object would otherwise fall off the free end 532. The second sensor 662 may detect objects approaching the first sensor 660 and may be configured to slow the first conveying surface 540 prior to reaching the free end 532. This may provide the operator with more time to pick up and load the object into the shipping container.

The first sensor 660 may also be configured to detect the hands of an operator. For example, the sensor 660 may have a line-of-sight 661 directed slightly above the first conveying surface 540. If the operator's hands are detected in the line-of-sight 661, it may indicate that the operator is ready to load the next object into the shipping container, and thus, the first sensor 660 may over-ride the speed decrease that would otherwise occur due to the second sensor 662. This may help increase throughput instead of continuously slowing down the first conveying surface 540.

The third sensor 664 may detect objects travelling along the second conveying surface 541. For example, the third sensor 664 may have a line-of-sight 665 that extends through slots 670 underneath the side guides 590, 592. The third sensor 664 may be configured to slow or stop the second conveying surface 541, for example, if one or more objects have accumulated on the first conveying surface 540. This may allow objects to be cued on the second conveying surface 541.

The fourth sensor 666 may detect objects travelling along the third conveying surface 542. For example, the fourth sensor 666 may be located near the rear end 533 of the third tiltable conveyor section 527. The fourth sensor 666 may be configured to slow or stop the third conveying surface 542, for example, if one or more objects have been accumulated on the second conveying surface 541. This may allow objects to be cued on the third conveying surface 542. The fourth sensor 666 may also be configured to slow or stop the extendable conveyor 516, for example, if one or more objects have accumulated on the third conveying surface 542.

As described above, the conveying surfaces 540, 541, 542 may be operated in forward or reverse to either load or unload objects from a shipping container. For example, with reference to FIG. 14, the conveying surfaces 540, 541, 542 may be configured to load objects into a shipping container by conveying objects from the extendable conveyor 516 toward the free end 532. In this case, each of the conveying surfaces 540, 541, 542 may be powered conveyor belts.

Alternatively, the conveying surfaces 540, 541, 542 may be configured to unload objects from a shipping container by conveying objects from the free end 532 toward the extendable conveyor 516. This operation may require one or more modifications to the apparatus 520. For example, with reference to FIG. 20, the transition plates 560, 562 may be reversed so that the first transition plate 560 is located above the second transition plate 562 instead of being underneath the second transition plate 562. Furthermore, the side guides 590, 592 may be reconfigured compared to the orientation shown in FIG. 14. These modifications may reduce the likelihood of objects becoming jammed when unloading objects from the shipping container.

The apparatus 520 may also be modified to include an additional set of side guides 596 along the first conveying surface 540. This may help prevent objects from falling off the first conveying surface 540 when being unloaded from a shipping container.

Furthermore, when unloading objects, the conveyor sections 525, 526, 527 may be reconfigured so that the driven roller of each conveyor belt is located toward the rear (i.e. closer to the extendable conveyor 516). This may help maintain tension along the conveyor belts. In contrast, the driven rollers may be located near the front of each conveyor belt when loading the shipping container.

When unloading objects from a shipping container, the third conveying surface 542 may be replaced with a gravity feed conveyor, which may include rollers for feeding packages to the extendable conveyor 516 under the force of gravity instead of using a powered conveyor.

While the description herein may refer to various directional qualifiers such as horizontal, vertical, front, rear, top and bottom and the like, these and other directional qualifiers are meant only to aid in describing the embodiments and should not be read as limiting.

What has been described is merely illustrative of the application of the principles of the embodiments. Other apparatus, methods and systems can be implemented by those skilled in the art without departing from the spirit and scope of the embodiments described herein.

The invention claimed is:

1. A conveyor apparatus comprising: a frame removably connectable to an extendable conveyor, and a pivoting conveyor coupled to the frame for conveying objects to or from the extendable conveyor, the pivoting conveyor including:
   (a) a first pivotable conveyor section having a free end shaped for supporting objects and having a first conveying surface for conveying objects to or from the free end, the first pivotable conveyor section being pivotally coupled to the frame about a vertical axis for pivoting the free end from side-to-side and being pivotally coupled to the frame about a first horizontal axis for pivoting the free end up and down;
   (b) a second non-pivotable conveyor section having a second conveying surface for conveying the objects to or from the first pivotable conveyor section; and
   (c) a plurality of transition plates located between the first and second conveying surfaces for transferring objects therebetween, the transition plates including:
      (i) a fixed transition plate located adjacent to the second conveying surface; and
      (ii) a shuttling transition plate located adjacent to the first conveying surface and configured to move laterally relative to the first conveying surface as the first pivotable conveyor section pivots about the vertical axis.

2. The apparatus of claim 1, wherein the fixed transition plate overlaps the shuttling transition plate.

3. The apparatus of claim 1, wherein the shuttling transition plate overlaps the fixed transition plate.

4. The apparatus of claim 1, further comprising a shuttling mechanism for automatically moving the shuttling transition plate laterally as the first pivotable conveyor section pivots about the vertical axis.

5. The apparatus of claim 4, wherein the shuttling mechanism includes:
   (a) a support plate for slidably supporting the shuttling transition plate;
   (b) a guide bar fastened to the shuttling transition plate and extending through a guide slot in the support plate; and
   (c) a pin fastened to the fixed transition plate and extending through a longitudinal slot in the shuttling transition plate and through a curved slot in the support plate.

6. The apparatus of claim 1, further comprising a plurality of side guides extending along the sides of at least one of the conveying surfaces for guiding the objects thereon.

7. The apparatus of claim 6, wherein the side guides include a first pivoting side guide pivotally coupled to the first pivotable conveyor section, and a second pivoting side guide pivotally coupled to the second non-pivotable conveyor section.

8. The apparatus of claim 7, wherein the first pivoting side guide is telescopically mounted to the second pivoting side guide.

9. The apparatus of claim 1, wherein the second conveying surface has a lower coefficient of friction than the first conveying surface.

10. The apparatus of claim 1, wherein the pivoting conveyor includes a third tiltable conveyor section having a third conveying surface for conveying the objects between the second non-pivoting conveyor and the extendable conveyor, the third tiltable conveyor section having a rear end for being connected to the extendable conveyor, the third tiltable conveyor section being pivotally coupled to the frame about a second horizontal axis for pivoting the rear end up and down.

11. A conveyor apparatus comprising: a frame removably connectable to an extendable conveyor, and a pivoting conveyor coupled to the frame for conveying objects to or from the extendable conveyor, the pivoting conveyor including:

(a) a first pivotable conveyor section having a free end shaped for supporting objects and having a first conveying surface for conveying objects to or from the free end, the first pivotable conveyor section being pivotally coupled to the frame about a vertical axis for pivoting the free end from side-to-side and being pivotally coupled to the frame about a first horizontal axis for pivoting the free end up and down;

(b) a second non-pivotable conveyor section having a second conveying surface for conveying the objects to or from the first pivotable conveyor section; and (c) a third tiltable conveyor section having a third conveying surface for conveying the objects between the second non-pivoting conveyor and the extendable conveyor, the third tiltable conveyor section having a rear end for being connected to the extendable conveyor, and the third tiltable conveyor section being pivotally coupled to the frame about a second horizontal axis for pivoting the rear end up and down.

12. The apparatus of claim 11, wherein the first, second, and third conveying surfaces are powered.

13. The apparatus of claim 11, wherein the frame includes:
(a) a first frame section for supporting the first pivotable conveyor section and the second non-pivotable conveyor section; and
(b) a second frame section for supporting the third tiltable conveyor section.

14. The apparatus of claim 11, wherein the second conveying surface has a lower coefficient of friction than the first and third conveying surfaces.

15. The apparatus of claim 11, wherein the pivoting conveyor includes at least one conveyor belt and at least one belt tensioner for maintaining tension along the conveyor belt, the belt tensioner including:
(a) a tension roller for pressing against the conveyor belt; and
(b) an actuator coupled to the tension roller for moving the tension roller towards or away from the conveyor belt.

16. The apparatus of claim 15, wherein the actuator is controlled by a source of fluid pressure.

17. The apparatus of claim 15, wherein the actuator is controlled by a compression spring.

18. The apparatus of claim 11, wherein the pivoting conveyor includes at least one sensor for detecting objects along at least one of the conveying surfaces, and wherein the sensor is configured to control speed of the at least one conveying surface.

19. A conveyor apparatus comprising:
(a) a frame removably connectable to an extendable conveyor;
(b) a pivoting conveyor coupled to the frame for pivotal movement about a generally vertical axis and for pivotal movement about a generally horizontal axis, the pivoting conveyor having a free end shaped for receiving objects, wherein the pivoting conveyor includes at least one conveying surface for conveying the objects between the free end and the extendable conveyor, wherein the free end can be moved from side-to-side by pivoting the pivoting conveyor about the vertical axis, and the free end can be moved up and down by pivoting the pivoting conveyor about the horizontal axis, and wherein the pivoting conveyor has a weight; and
(c) a counter balance mechanism coupled to the pivoting conveyor for counteracting the weight of the pivoting conveyor.

20. The apparatus of claim 19, wherein the weight of the pivoting conveyor creates a first moment of force about the horizontal axis, and the counter balance mechanism is configured to apply a force to the pivoting conveyor so as to create a second moment of force about the horizontal axis that is approximately equal and opposite to the first moment of force.

21. The apparatus of claim 19, wherein the counter balance mechanism comprises an air cylinder for applying the force to the pivoting conveyor.

22. The apparatus of claim 19, further comprising a brake assembly coupled to the pivoting conveyor for selectively inhibiting pivotal movement of the pivoting conveyor about the horizontal axis.

23. The apparatus of claim 19, wherein the pivoting conveyor includes:
(a) a slewing conveyor section pivotally coupled to the frame for pivotal movement about the vertical axis; and
(b) a tiltable conveyor section having a first end pivotally coupled to the slewing section for pivotal movement about the horizontal axis and a second end that is the free end of the pivoting conveyor.

24. The apparatus of claim 19, wherein the pivoting conveyor includes:
(a) a first pivotable conveyor section having a first conveying surface for conveying the objects to or from the free end, the first pivotable conveyor section being pivotally coupled to the frame about the vertical axis for pivoting the free end from side-to-side and being pivotally coupled to the frame about the horizontal axis for pivoting the free end up and down;
(b) a second non-pivotable conveyor section having a second conveying surface for conveying the objects to or from the first pivotable conveyor section; and
(c) a third tiltable conveyor section having a third conveying surface for conveying the objects between the second non-pivoting conveyor and the extendable conveyor, the third tiltable conveyor section having a rear end for being connected to the extendable conveyor, and the third tiltable conveyor section being pivotally coupled to the frame about a second horizontal axis for pivoting the rear end up and down.

* * * * *